(12) United States Patent
Kpodzo et al.

(10) Patent No.: US 9,350,398 B2
(45) Date of Patent: May 24, 2016

(54) MULTIPLE INTERFERER CANCELLATION FOR COMMUNICATIONS SYSTEMS

(71) Applicant: L-3 Communications Corporation, New York, NY (US)

(72) Inventors: Elias Bonaventure Kpodzo, Franklin Park, NJ (US); Robert Holland, Moorestown, NJ (US); Yanhua Deng, Gainesville, FL (US); Paul Dourbal, Princeton Junction, NJ (US)

(73) Assignee: L-3 Communications Corporation, New York, NY (US)

( * ) Notice: Subject to any disclaimer, the term of this patent is extended or adjusted under 35 U.S.C. 154(b) by 205 days.

(21) Appl. No.: 13/899,505

(22) Filed: May 21, 2013

(65) Prior Publication Data

US 2013/0308940 A1 Nov. 21, 2013

Related U.S. Application Data

(60) Provisional application No. 61/649,856, filed on May 21, 2012, provisional application No. 61/649,715, filed on May 21, 2012, provisional application No. 61/649,843, filed on May 21, 2012.

(51) Int. Cl.
*H04B 10/00* (2013.01)
*H04B 1/10* (2006.01)
*H04K 3/00* (2006.01)

(52) U.S. Cl.
CPC ............... *H04B 1/1027* (2013.01); *H04B 1/10* (2013.01); *H04B 1/109* (2013.01); *H04K 3/20* (2013.01); *H04K 3/228* (2013.01)

(58) Field of Classification Search
CPC .......... H04K 3/20; H04B 1/10; H04B 1/1027; H04B 1/109
USPC ............................................................ 398/39
See application file for complete search history.

(56) References Cited

U.S. PATENT DOCUMENTS

| | | | | |
|---|---|---|---|---|
| 6,141,393 | A * | 10/2000 | Thomas | H04B 7/0851 375/347 |
| 6,525,682 | B2 * | 2/2003 | Yap | H03M 3/468 341/137 |
| 7,035,550 | B2 * | 4/2006 | Prucnal | H04B 10/299 398/175 |
| 7,068,894 | B2 | 6/2006 | Prucnal et al. | |
| 7,856,184 | B2 * | 12/2010 | Li | H04B 10/25758 398/115 |
| 8,081,946 | B2 * | 12/2011 | Fudge | H04B 1/1036 455/295 |

(Continued)

OTHER PUBLICATIONS

"RFI/EMI Current Probes and Injection Probes", Solar Electronics Company, 33-36 pages.

(Continued)

*Primary Examiner* — Danny Leung
(74) *Attorney, Agent, or Firm* — Condo Roccia Koptiw LLP

(57) ABSTRACT

An interference cancellation system (ICS) may be used with a communication system to prevent or minimize interference from one or more sources. The ICS may receive radio RF signals comprised of one or more signals of interest (SOI) and multiple interfering signals. The ICS may use a sample of the interfering signals to cancel the interfering signals from the SOI. The multiple interfering signals may be converted into a single optical signal for cancellation. One or more optical cancellation paths may be used for interference cancellation. Each optical cancellation path may include an optical attenuator and/or an optical delay to achieve phase shifts and/or delays for interference cancellation.

20 Claims, 10 Drawing Sheets

(56) References Cited

U.S. PATENT DOCUMENTS

| | | | |
|---|---|---|---|
| 8,103,175 B1* | 1/2012 | Kowalczyk | H04B 10/25759 359/334 |
| 2001/0020908 A1* | 9/2001 | Prucnal | H04L 7/0075 341/137 |
| 2002/0012495 A1 | 1/2002 | Sasai et al. | |
| 2004/0037524 A1* | 2/2004 | Shahar | G02B 6/125 385/122 |
| 2004/0037525 A1* | 2/2004 | Shahar | G02F 1/3517 385/122 |
| 2004/0146237 A1 | 7/2004 | Taylor et al. | |
| 2004/0208626 A1* | 10/2004 | Nishimura | H04B 10/2537 398/161 |
| 2004/0208636 A1 | 10/2004 | Reynolds et al. | |
| 2004/0213508 A1* | 10/2004 | Shahar | G02B 6/125 385/16 |
| 2005/0033966 A1* | 2/2005 | Johnson | G06F 21/6218 713/176 |
| 2005/0105847 A1* | 5/2005 | Prucnal | G02F 1/3519 385/27 |
| 2006/0161055 A1* | 7/2006 | Pewzner | A61B 5/0059 600/310 |
| 2007/0237270 A1* | 10/2007 | Mezer | H04B 3/23 375/346 |
| 2008/0212968 A1 | 9/2008 | Lindop et al. | |
| 2009/0263137 A1* | 10/2009 | Hossein-Zadeh | H04B 1/30 398/115 |
| 2010/0098411 A1 | 4/2010 | Nakashima et al. | |
| 2011/0129026 A1 | 6/2011 | Um et al. | |
| 2011/0287720 A1* | 11/2011 | Cox | H04B 1/525 455/63.1 |
| 2012/0052892 A1 | 3/2012 | Braithwaite | |
| 2012/0201173 A1* | 8/2012 | Jain | H04B 1/525 370/277 |
| 2012/0251031 A1* | 10/2012 | Suarez | G02F 2/002 385/3 |
| 2012/0294608 A1* | 11/2012 | Prucnal | H04K 3/228 398/39 |
| 2013/0308940 A1* | 11/2013 | Kpodzo | H04B 1/1027 398/39 |
| 2014/0218240 A1* | 8/2014 | Kpodzo | G01S 5/0215 342/450 |
| 2014/0282783 A1* | 9/2014 | Totten | H04L 12/2885 725/111 |

OTHER PUBLICATIONS

Akajoki, et al., "Model Optical Transmitters with a Circuit Simulator", Microwaves & RF, vol. 44, Apr. 15, 2005, 92 pages.
Biedka et al., "Smart Antenna for Handsets", Bradley Department of Electrical and Computer Engineering, Virginia Polytechnic Institute and State University, Blacksburg, VA 24061-0111, Aug. 2, 2000, 5 pages.
Brahimi et al., "CAD of Microwave Optical Systems for Time & Frequency Applications", LAAS-CNRS, The European Forum for Time and Frequency 08, Version 1, Toulouse, France, Apr. 29, 2008, 5 pages.
Choi et al., "Achieving Single Channel, Full Duplex Wireless Communication", In Proceedings of the Sixteenth Annual International Conference on Mobile Computing and Networking, MobiCom'10, ACM, Sep. 20-24, 2010, 1-12.
Choi et al., "The Effects of Co-channel Interference on Spatial Diversity Techniques", IEEE Wireless Communications and Networking Conference, Mar. 11-15, 2007, 1938-1943.
Donlan, "Ultra-wideband Narrowband Interference Cancellation and Channel Modeling for Communications", Thesis, Electrical and Computer Engineering, Jan. 31, 2005, 119 pages.
Gheorma et al., "RF Photonic Techniques for Same Frequency Simultaneous Duplex Antenna Operation", Photonics Technology Letters, vol. 19, No. 13, Jul. 1, 2007, 1014-1016.
Gollakota et al., "ZigZag Decoding: Combating Hidden Terminals in Wireless Networks", In Proceedings of the ACM SIGCOMM 2008 conference on Data communication, Aug. 17-22, 2008, 159-170.
Halperin et al., "Taking the Sting out of Carrier Sense: Interference Cancellation for Wireless LANs", In Proceedings of the 14th ACM international conference on Mobile computing and networking, Sep. 8-12, 2008, 12 pages.
Intersil, "Active Isolation Enhancer and Interference Canceller", Qhx220 narrowband noise canceller, Oct. 20, 2009, 1-19.
Jain et al., "Practical, Real-time, Full-Duplex Wireless", In Proceedings of the 17th Annual International Conference on Mobile Computing and Networking, Mobicom, Sep. 19-23, 2011, 12 Pages.
Johnson et al., "Interferometric Modulators for an Adaptive Nulling System", SPIE Analog Photonics, vol. 1790, Feb. 26, 1993, 50-54.
Kim et al., "Adaptive Feedback Interference Cancellation System (AF-ICS)", Microwave Symposium Digest, IEEE MTT-S International, vol. 1, Jun. 8-13, 2003, 627-630.
Naglich et al., "Tunable, Substrate Integrated, High Q Filter Cascade for High Isolation", Microwave Symposium Digest (MTT), 2010 IEEE MTT-S International, May 23-28, 2010, 1468-1471.
Nightingale et al., "An Eight Channel Interference Cancellation System", Microwave Symposium Digest, IEEE MTT-S International, Jun. 11-16, 2006, 914-917.
Raghavan, et al., "Analysis and Design of an Interference Canceller for Collocated Radios", IEEE Transactions on Microwave Theory and Techniques, vol. 53, No. 11, Nov. 2005, 3498-3508.
Reines et al., "Compact Low-Loss Tunable X-Band Bandstop Filter With Miniature RF-MEMS Switches", IEEE Trans. Microwave Theory and Techniques, vol. 58, No. 7, Jul. 2010, 1887-1895.
Sonnenschein et al., "A Design for an Electro-Optic Implementation of a Wideband Nulling System", IEEE, MIT Lincoln Lab., Tech. Rep. 887, vol. 2, Sep. 30-Oct. 3, 1990, 742-748.
Stutzman et al., "Recent Results From Smart Antenna Experiments—Base Station and Handheld Terminals", IEEE, Radio and Wireless Conference, RAWCON 2000, Sep. 10-13, 2000, 139-142.
Suarez et al., "Incoherent Method of Optical Interference Cancellation for Radio Frequency Communications", IEEE Journal of Quantum Electronics, vol. 45, No. 4, Apr. 2009, 402-408.
Suarez et al., "Methods of Feedback Control for Adaptive Counter-Phase Optical Interference Cancellation", IEEE Transactions on Instrumentation and Measurement, vol. 60, No. 2, Feb. 2011, 598-607.
Suarez et al., "System Level Performance and Characterization of Counter-phase Optical Interference Cancellation", IEEE, Journal of Lightwave Technology, vol. 28, No. 12, Jun. 15, 2010, 1821-1831.
Suarez, John, "Electro-Optic Counter-Phase Modulation for Broadband Radio-Frequency Interference Cancellation", Dissertation Presented to the Faculty of Princeton University, Apr. 2012, 224 pages.
Ward et al., "Design and Fabrication of a Multichannel Adaptive Optical Processor (MADOP)", In-House Report, RL-TR-92-333, Dec. 1992, 59 pages.
Kay, Steven M., "Fundamentals of Statistical Signal Processing: Estimation Theory", Prentice Hall Signal Processing Series, 1993, pp. 1-595.

* cited by examiner

Before cancellation

After cancellation

MULTIPLE INTERFERER CANCELLATION FOR COMMUNICATIONS SYSTEMS

CROSS-REFERENCE TO RELATED APPLICATIONS

This application claims the benefit of U.S. Provisional Patent Application No. 61/649,856, filed on May 21, 2012, U.S. Provisional Patent Application No. 61/649,715, filed May 21, 2012, and U.S. Provisional Patent Application No. 61/649,843, filed May 21, 2012, the contents of which are incorporated by reference herein in their entirety.

This application may include subject matter that is related to subject matter included in U.S. patent application Ser. No. 13/899,368, filed May 21, 2013 and U.S. patent application Ser. No. 13/899,529, filed May 21, 2013.

BACKGROUND

The radio spectrum is crowded due to the growth in the demand for radio frequency (RF) applications. Multiple wireless communications systems may be allocated in close proximity or in the same radio spectrum. For example, one or more RF jammers or other wireless communications systems may be in close proximity to, and cause interference at, a transceiver attempting to receive a signal from one or more other communications systems. Acceptable quality of performance of a radio transceiver and/or radio communications may be difficult to achieve due to such interference.

SUMMARY

Systems and methods are described herein for an interference cancellation system (ICS) that may be used with various communications systems to prevent or minimize interference from one or more sources. For example, the ICS may be configured to receive RF signals comprised of at least one signal of interest (SOI) and a plurality of interfering signals. The ICS may determine a sample of the interfering signals and convert the RF signals to optical signals for cancellation of the interference. The plurality of interfering signals may be converted into a single optical signal for cancellation. Optical attenuators and/or delays may be used by the ICS for weighted networks to achieve amplitude, phase shifts, and delays for signal cancellation.

DETAILED DESCRIPTION

Figure 1:
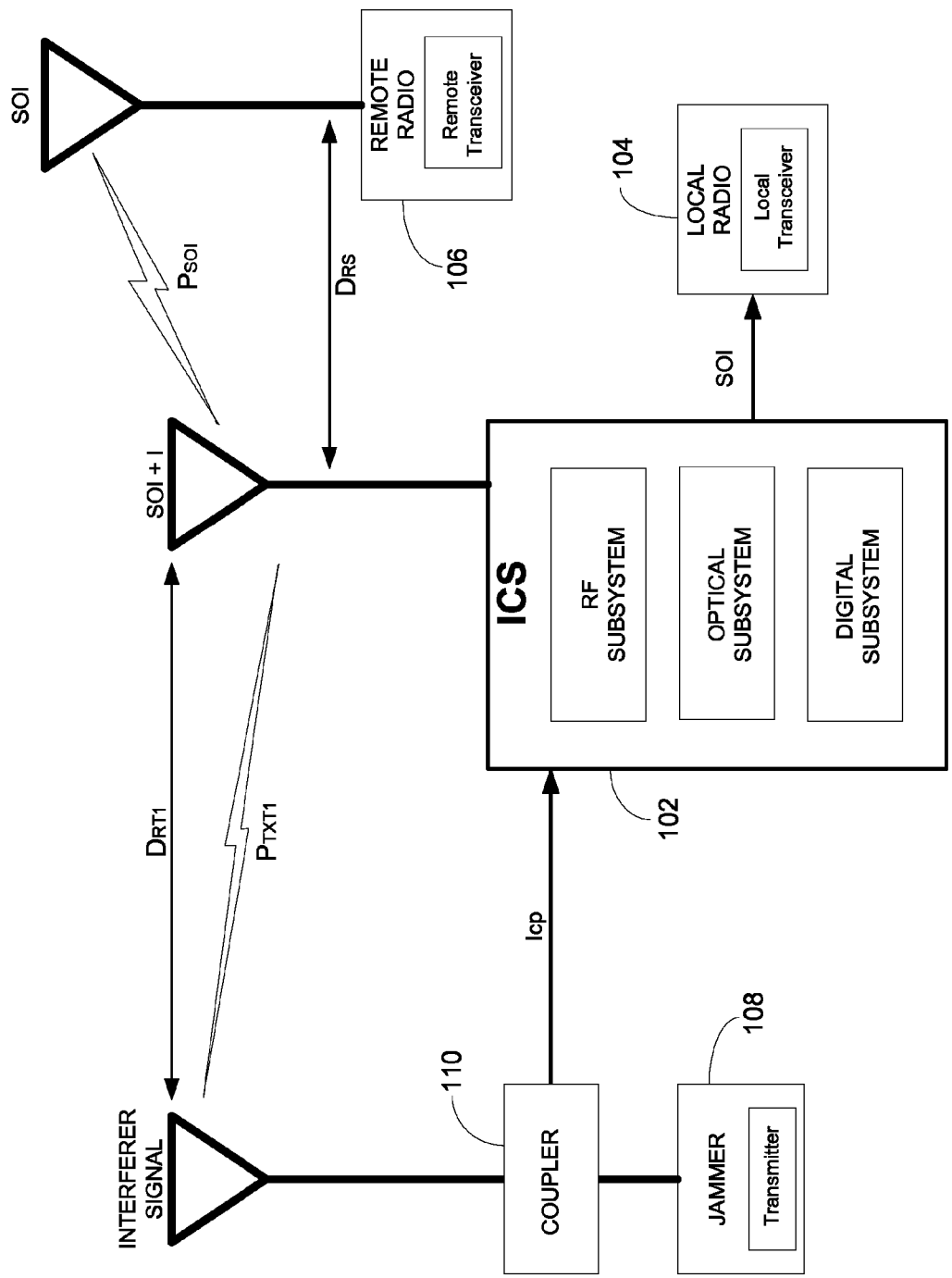
FIG. 1 is a system diagram of an example architecture in which an interference cancellation system (ICS) may be implemented.

An interference cancellation system (ICS) may be used with various communications systems to prevent or minimize interference with voice and/or data transmitted via the communications systems. For example, the ICS may be used to enable receipt of wireless communications by a transceiver in proximity to other wireless communications that may be causing interference, such as a radio frequency (RF) jammer or other communications device that may cause RF interference.

RF jamming may be used as a defense to protect military vehicles from mines and/or Improvised Explosive Devices (IEDs), such as those detonated remotely for example. RF jamming may be used to disrupt enemy communications. To effectively jam hostile communications channels, the jammers may transmit high power, broad-band signals in the same bands that may be used for friendly communications. While providing protection by blocking enemy signals, jammers may saturate the electromagnetic spectrum and interfere with friendly signals being transmitted or received within a wireless range of the jammers. Embodiments are described herein that enable compatibility between jammers/interferers and other communications equipment. While the embodiments described herein may be described with reference to jammers and/or other military communications equipment, they may be implemented in any communication system to minimize or cancel interference at a transceiver.

Communications equipment and jammers may work in harmony even when the systems are operating at the same frequency. An ICS may be seamlessly integrated with existing field equipment (e.g., jammers/interferers and/or radio transceivers) for communication system deployment in the field, in the air, on ships, on submarines, or in any other area in which wireless communications equipment may be implemented. The ICS may be used to enable the communications equipment to transmit and/or receive information via one or more wireless signals while a jammer may cause interference. The ICS may cancel the interfering signals and allowing the data being transmitted to be properly received.

An optical ICS that may receive one or more signals of interest (SOIs) and one or more interfering signals and may perform cancellation of the interfering signals to allow the SOI to be properly communicated. The optical ICS may connect to communications equipment and/or jammers, which may be in service. The optical ICS may identify remote jammers/interferers to reduce jamming/interference, such as jamming/interference that may not be removed by receiver RF front end filters for example. The optical ICS may be packaged into a stand-alone ICS box or incorporated into the communications equipment. For example, the optical ICS may be integrated with the jammer and/or the device intended to receive the SOI. If the ICS is integrated with a radio and/or jammer, the ICS may be integrated with the co-located radio and/or jammer without modification to these systems or degradation to their system performance.

The ICS may be implemented in the field, in the air, on ships, on submarines, or in any other area in which wireless communications equipment may be implemented. For example, the ICS may be implemented on a Navy ship or submarine and may be compatible with the Navy's multiple forms of communications equipment. The ICS may be used by Blue Force units to simultaneously conduct missions while maintaining other communications, command, and control. This combination may enable situational awareness by the warfighters, even in the environment where multiple radio transceivers are co-located. The ICS may be used by cellular communications devices, satellite communications (Satcom) devices, or any other RF communications device.

The ICS may interface to any tactical radio transceiver and/or may be implemented as an upgrade kit. For example, the ICS may be kitted with mounting hardware and/or cable sets to match various communications equipment configurations. The ICS may be implemented as a plug and play system. The ICS design may be integrated with any radio transceiver and/or communications equipment without modification to the radio transceiver and/or communications equipment. This may allow easy installation of the equipment as a retro upgrade, such as on a ship or submarine for example.

The presence of multiple communications systems in the same or similar area (e.g., in the field, in the air, on a ship, or on a submarine) may create an inter jamming environment for one or more transceivers in that area. The ICS may be used for the removal of interference from multiple interferers. This may allow various co-located radio transceivers to communicate seamlessly with other communications systems within and/or outside the perimeter of a given area. Technical metrics considered for enabling performance may include operating bandwidth, cancellation bandwidth, cancellation level, and/or bit error rate for communication equipment.

The embodiments described herein may be used to provide an automated RF spectrum management and multiple interference cancellation for communications systems. Narrowband interference of a wideband signal, wideband interference, and/or co-site interference may be considered in determining efficient use of the frequency spectrum. The described embodiments may be implemented using hardware and/or software.

FIG. 1 illustrates an example system including an ICS. For example, ICS 102 may be configured to provide interference cancellation in multi-faceted environments, such as environments including one or more remote interferers (e.g., an interferer is not co-located and/or is not coupled to the ICS) and/or one or more unknown jammers/interferers. As illustrated in FIG. 1, Local Radio 104 may be attempting to communicate with Remote Radio 106. Each of the radios may include a transceiver configured to provide operable wireless communications between the radio systems. For example, Local Radio 104 may include a local transceiver that is configured to perform transmit and/or receive processing of radio signals transmitted from and/or received by Local Radio 104. The local transceiver may be coupled to one or more antennas in order to transmit and/or receive radio signals over the air. Similarly, Remote Radio 106 may also include a transceiver (e.g., remote transceiver) that is configured to perform transmit and/or receive processing of radio signals transmitted from and/or received by Remote Radio 106. The remote transceiver may be coupled to one or more antennas in order to transmit and/or receive radio signals over the air.

As an example, Remote Radio 106 may transmit a signal of interest (SOI) to Local Radio 104. For example, Remote Radio 106 may send a communication from an ally that is meant to be received by the user of Local Radio 104. The distance between the location of Remote Radio 106 and Local Radio 104 may be expressed as $D_{RS}$. The received signal power of the SOI may be expressed as $P_{SOI}$.

However, during the period wherein Remote Radio 106 is attempting to communicate with Local Radio 104, one or more interference signals may be emitted by various interference sources. The interference signals may be received at Local Radio 104 in addition to the SOI. For example, Jammer 108 may include a transmitter and one or more antennas that may be configured to transmit an Interferer Signal (I). The Interferer Signal (I) may include transmissions on one or more frequencies that may be the same or close to one or more frequencies that may be used to transmit the SOI, and hence may result in interference between the SOI and the I. The presence of the Interferer Signal may make it difficult for the local transceiver of Local Radio 104 to properly receive and process the SOI. The distance between the location of Jammer 108 and Local Radio 104 may be expressed as $D_{RTI}$. The received signal power of the Interferer Signal at Local Radio 104 may be expressed as $P_{TXT1}$.

In many practical scenarios, the Interferer Signal (I) may be a much higher power signal than the SOI in the vicinity of Local Radio 104. For example, Local Radio 104 may be co-located with Jammer 108 on a military vehicle. Remote Radio 106 may be several miles away from both Local Radio 104 and Jammer 108. Thus, for one or more example it may be assumed that $D_{SOI}$ is much larger (e.g., orders of magnitude larger) than $D_{RTI}$. Additionally, since Jammer 108 typically emits a very high power Interferer Signal that does not travel very far to reach Local Radio 104 (e.g., while Remote Radio 106 may emit a relatively lower power SOI that may travel orders of magnitude farther than the Interferer Signal (I) prior to reaching Local Radio 104), it may also be assumed that $P_{TXT1}$ is much larger (e.g., order of magnitude larger) than $P_{SOI}$. This may be the case when the Jammer is located in or around the vicinity of the ICS, while Remote Radio 2 may be several miles (or more) away from the ICS.

Thus, when both Remote Radio 106 and Jammer 108 are in simultaneous operation, the actual signal received at the one or more antennas associated with Local Radio 104 may be a combined SOI and Interferer Signal (e.g., SOI+I). It may be difficult for Local Radio 104 to determine the SOI from the SOI+I signal using conventional interference mitigation techniques, for example since the I signal may be much higher power than the SOI and may include one or more components in the same frequency range as the SOI.

Therefore, in an example, ICS 102 may be inserted between the one or more antennas associated with Local Radio 104 and the local transceiver of Local Radio 104. ICS 102 may be configured to attempt to cancel the Interferer Signal (I) from the combined SOI+I signal that is received at the one or more antennas associated with Local Radio 104. For example, ICS 102 may obtain a sample of the Interferer Signal (I), for example via Coupler 110 that is operably connected to Jammer 108. For example, in the case where both Hammer 108 and Local Radio 104 are co-located on a military vehicle, Coupler 110 may act to provide ICS 102 with a sample of the Interferer Signal (I) produced by Jammer 108 prior to the Interferer Signal (I) being sent over the air using one or more antennas associated with Jammer 108 (e.g., Coupler 110 may be inserted between the transmitter of Jammer 108 and the one or more antennas associated with Jammer 108). Coupler 110 may be configured to provide a physical cable connection such that ICS 102 may receive a copy of the RF signal being transmitted by Jammer 108. In another example, the Interferer Signal (I) may be communicated to the ICS via a wireless signal. The sample of the Interferer Signal (I) that is provided to the ICS may be expressed as $I_{cp}$.

In order to properly detect the SOI from the SOI+I signal, ICS 102 may be configured to use one or more of RF, optical, and/or digital signal processing (DSP) techniques to cancel the Interferer Signal (I) from the SOI+I signal. For example, the ICS may include an RF Subsystem, an Optical Subsystem, and/or a Digital Subsystem. The RF Subsystem, the Optical Subsystem, and/or the Digital Subsystem may be configured to remove or cancel most or all of the Interferer Signal (I) from the signal received over the one or more antennas associated with Local Radio 104. The techniques utilized by the RF Subsystem, the Optical Subsystem, and/or Digital Subsystem 380 are described in more detail below. Upon successfully cancelling the Interferer Signal (I), ICS 102 may send the SOI to the local transceiver of Radio 104 for further reception processing.

For example, ICS 102 may include one or more of optical components (e.g., an Optical Subsystem), radio frequency components (e.g., an RF Subsystem), and/or digital signal processing components (e.g., a Digital Control Subsystem) to perform interference cancellation. In an example, ICS 102 may convert RF and/or microwave input signals into optical signals. The ICS may use optical components to perform precise attenuation and time delay of the converted signal to achieve optimal cancellation depths across an instantaneous bandwidth of hundreds of MHz. For example, the system may operate to perform interference cancellation from high frequency (HF) bands (e.g., 3-30 MHz) to S bands (e.g., 2 to 4 GHz) and beyond.

The optical components of ICS 102 may be configured to perform precise inversion and recombination of two RF signals, which may be achieved with greater accuracy in the optical domain than in the RF domain. For the undesired interference signal to be perfectly or near-perfectly cancelled, the inversion process may result in an inverted interference signal that is nearly an exact replica of the original signal, except for the relative inversion. In the RF domain, it is difficult to achieve near-perfect replication of a signal over a wide range of frequencies. However, optical components may be configured to achieve near perfect replication and inversion during an inversion and recombination process.

Figure 2:
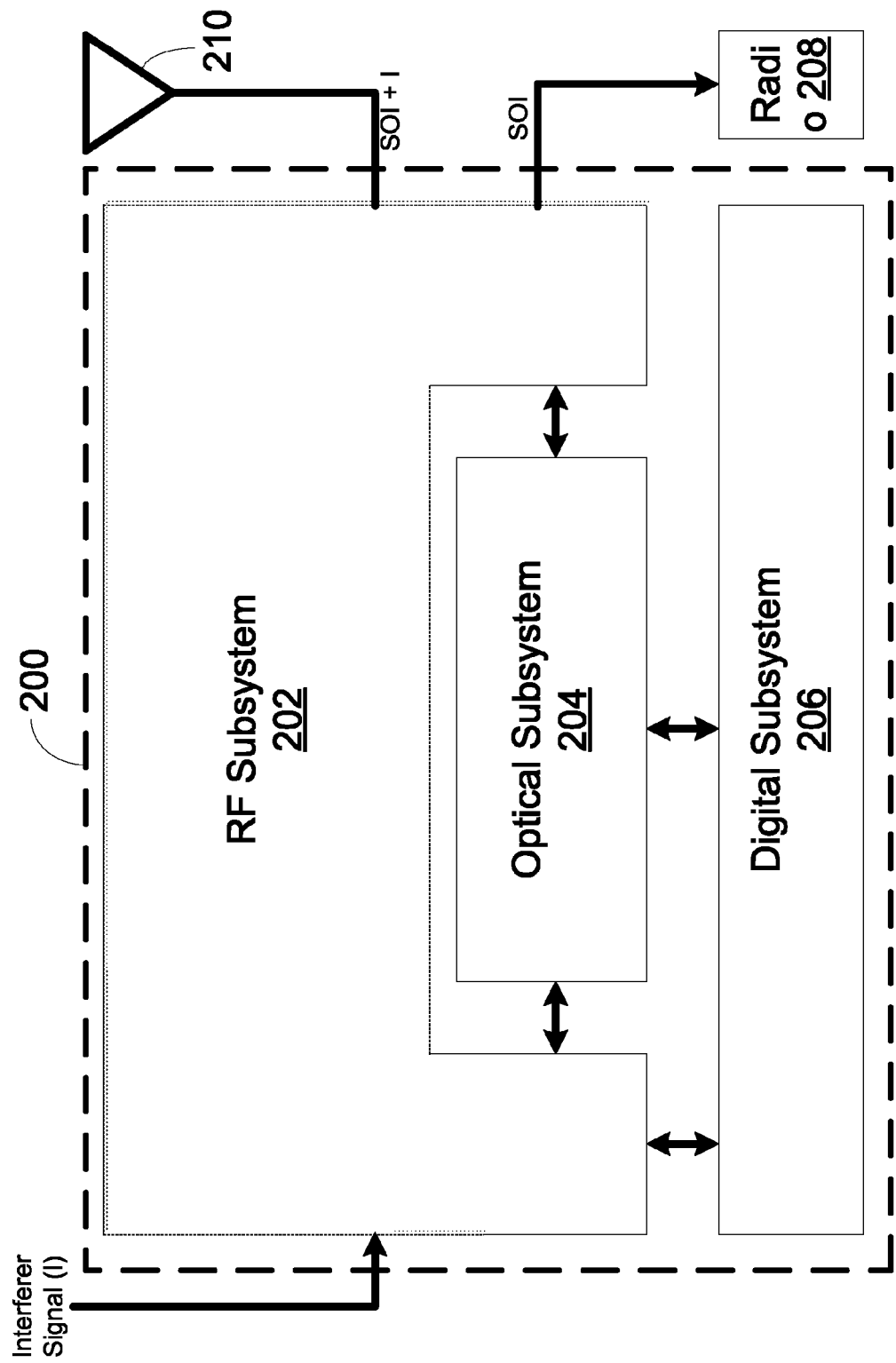
FIG. 2 is a system diagram of an example interference cancellation system.

FIG. 2 illustrates an example ICS 200. For example, ICS 200 may include one or more of RF Subsystem 202, Optical Subsystem 204, and/or Digital Subsystem 206. RF Subsystem 202 may be operably coupled to one or more antennas 210. One or more antennas 210 may be used by Radio 208 for transmitting and/or receiving signals from remote radios. For example, a signal of interest (SOI) plus the Interferer Signal (I) (e.g., SOI+I) may be received via one or more antennas 210 and provided to ICS 200 (e.g., RF Subsystem 202). RF Subsystem 202 may also receive a copy of the Interferer Signal (I) as an input in addition to the combined SOI+I signal received via the one or more antennas 210. For example, ICS 200 may be operably coupled to a jammer that produces the Interferer Signal (I), and the output of the jammer may be provided to ICS 200 via a physical connection (e.g., via a coupler of FIG. 1).

In an example, ICS 200 may receive the Interferer Signal via a second antenna and/or a plurality of second antennas (not shown in FIG. 2). One or more of RF subsystem 202 and/or Digital Subsystem 206 may be configured to determine an estimate of the Interferer Signal (I) based on a signal received via one or more one or more antennas 201 and/or the second antenna and/or the plurality of second antennas. The estimate off the interferer signal may then be utilized by the ICS. One or more of RF Subsystem 202, Optical Subsystem 204, and/or Digital Subsystem 206 may be configured to utilize knowledge of the Interferer Signal (I) to cancel Interferer Signal from the combined SOI+I signal received via the one or more antennas 210. The result of the cancellation may be the SOI. RF Subsystem 202 may send the SOI to Radio 208 that is operably coupled to the RF subsystem for further reception processing (e.g., demodulation, decoding, etc.).

As an example, many common types of jammers are configured to saturate receivers operating at or near 300 MHz. For example, such jammers may be designed to prevent communications that utilize frequencies in or around 300 MHz (e.g., garage door openers). Typical broadband, noise-like jammers in this range may output signals with power levels of approximately 100 W (50 dBm) over a 300 MHz to 400 MHz bandwidth. However, such a jammer may prevent communication over a large portion of the 225 MHz to 512 MHz UHF communications band as well as a major portion of the 292 MHz to 318 MHz UHF Satellite Communication (SATCOM) band, in addition to the desired 300 MHz cancellation. The +50 dBm 100 MHz broadband noise may be equivalent to a 15 dBm noise signal over a plurality of 25 kHz communications channels. Assuming 20 dB of antenna coupling loss between a jammer and ICS 200, the jamming signal (e.g., Interferer Signal (I)) reaching the radio transceiver antenna may be expected to be around −5 dBm over the 25 kHz channel. For example, 20 dB antenna coupling estimate for 300 MHz operation may be estimated using two quarter wave monopoles separated by three wavelengths over a perfect ground plane. This level of interference may be more than sufficient to jam communications in this band, assuming transceiver sensitivity between −110 dBm and −120 dBm for 10 dB signal-to-noise and distortion ratio (SINAD), depending on the operating mode and application.

Optical cancellation techniques may offer broadband interference cancellation with a significantly greater depth than conventional RF cancellation. Optical Subsystem 204 may be configured to perform interference cancellation using optical interference cancellation techniques. For example, for a 100 MHz broadband jamming signal, over 30 dB of interference cancellation may be obtained using optical techniques. Optical cancellation is typically more effective than RF cancellation alone, for example due to the higher bandwidth of operation and much lower amplitude and/or frequency dispersion in optical components as compared to RF components. An optical link between a received and sampled jammer output (e.g., the sampled jammer signal) and ICS 200 may reduce directly coupled jammer power, preventing the jammer signal from reaching the transceiver antenna input. Optical cancellation does not suffer from RF leakage into an RF interference cancellation system, which may create offsets that reduce effective jammer cancellation in the ICS.

By cancelling the majority of the interferer signal in the optical domain, ICS 200 may allow communication systems to perform simultaneous jamming and operative communication in the jammed frequency range. This optical cancellation technique may utilize active cancellation between jammers (e.g., counter-IED jammers) and radio systems to prevent self-interference. The ICS may also be applied to commercial systems suffering from saturated receivers. Optical interference cancellation may allow for processing an extremely wide range of frequencies with minimum distortion. The optical components may allow for multiple orders of magnitude in bandwidth, as well as lower amplitude and phase fluctuation.

For an active interference implementation, the interfering signal may be accurately estimated or sampled in real time. A copy of the clean transmit signal from any jammer or interferer may be obtained using direct coupling or magnetic coupling with an electromagnetic interference (EMI) probe and/or current probe. In the case of a remote jammer (e.g., the jammer is not directly or physically connected to the ICS), a copy of the jamming signal may be obtained by accurately estimating the jammer signal using a signal received via an antenna.

Figure 3A:
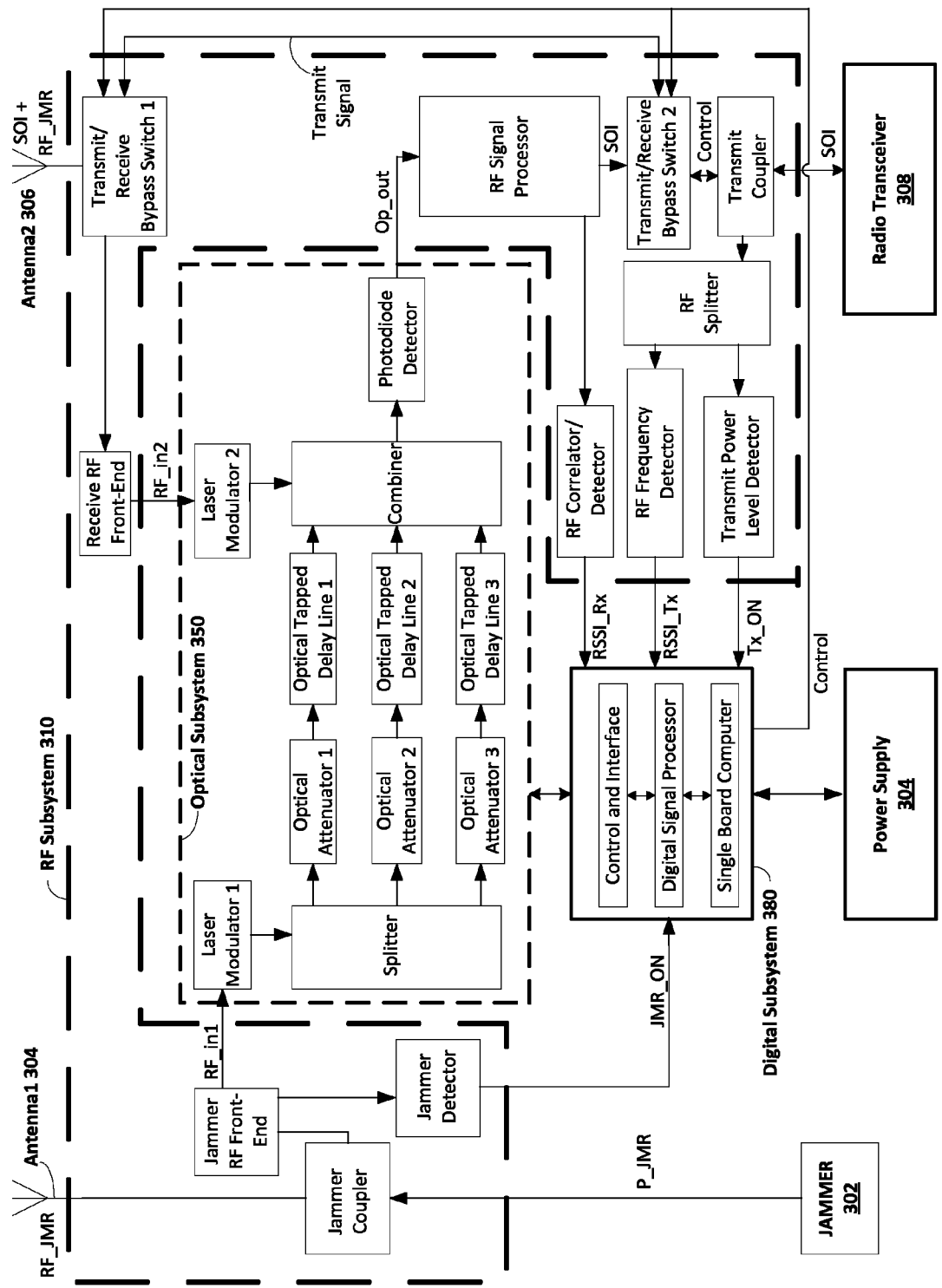
FIG. 3A illustrates an example system architecture for an ICS.

FIG. 3A illustrates an example system architecture for an ICS. For example, an ICS may include one or more of RF Subsystem 310, Optical Subsystem 350, and/or Digital Subsystem 380. Power Supply 304 may provide power to one or more of RF Subsystem 310, Optical Subsystem 350, and/or Digital Subsystem 380. As shown in FIG. 3A, Jammer 302 may be operably coupled to RF Subsystem 310. RF Subsystem 310 may include one or more RF processing components, and the components and functionality of RF Subsystem 310 are described in more detail with respect to FIG. 3C. Additionally, Jammer 302 may be operably coupled to one or more antennas (e.g., Antenna1 304). Jammer 302 may be coupled to the one or more antennas (e.g., Antenna1 304) via RF Subsystem 310. For example, a jammer coupler with RF Subsystem 310 may be used so that the ICS may be quickly inserted between an operational jammer and an antenna used to transmit the jammer signal. P_JMR may represent the jammer signal prior to being transmitted by the one or more antennas (e.g., Antenna1 304). RF_JMR may represent the RF jammer signal transmitted via the one or more antennas (e.g., Antenna1 304).

In the example shown in FIG. 3A, Jammer 302 may be physically connected to RF Subsystem 310 in order for RF Subsystem 310 to obtain a sample or copy of the jammer signal. A copy of the transmitted jammer signal (e.g., RF_JMR) may be used as an input to the interference cancellation system. For example, one or more components of RF Subsystem 310 (e.g., Jammer RF Front-End processing component(s), Jammer Detector components, etc.) may perform RF processing on the sample/copy of the jammer signal (e.g., RF_JMR) in order to filter the jammer signal and/or detect jammer operation prior to processing by Optical Subsystem 350. Such Jammer signal pre-processing will be described in more detail with respect to FIG. 3C.

When Jammer 302 is in use, jammer detection component(s) of RF Subsystem 310 may send an indication that Jammer 302 is in operation to Digital Subsystem 380 via the JMR_ON signal. The ICS may be configured to determine to begin interference cancellation based on the concurrent detection of Jammer 302 transmission and lack of transmission by Radio Transceiver 308. For example, Radio Transceiver 308 may be any radio system that may experience interference due to transmissions from Jammer 302. Radio Transceiver 308 may be configured to perform receive and/or transmit processing of RF signals transmitted via one or more antennas (e.g., Antenna2 306). To prevent interference from Jammer 302 from saturating Radio Transceiver 308 during periods where it is attempting to receive an SOI via Antenna2 306, an ICS may be inserted between Radio Transceiver 308 and Antenna2 306. The ICS may receive a signal comprised of the combination of the SOI and the Interferer Signal (I) (e.g., SOI+RF_JMR) via Anetnna2 306 and may remove a large majority of the Interferer Signal (I) (e.g., RF_JMR) such that the SOI may be passed to Radio Transceiver 308 for further processing.

After performing RF preprocessing on the sampled jammer signal (e.g., RF_JMR), RF Subsystem 310 may send a copy of the Jammer signal to Optical Subsystem 350 in order for Optical Subsystem 350 to perform cancellation of the jammer signal from the signal that is received via Antenna2 306. For example, RF_in1 may represent the copy of the jammer signal (e.g., RF_JMR) provided to Optical Subsystem 350. Operation of Optical Subsystem 350 will be described in more detail with respect to FIG. 3B.

In an example, Antenna2 306 may be configured to receive a signal of interest from a remote radio (e.g., SOI). While Jammer 302 is in operation, the jammer signal (e.g., RF_JMR) may interfere with SOI such that Antenna2 306 receives the signal SOI+RF_JMR. RF Subsystem 310 may perform RF preprocessing on the signal received via Antenna2 306 (e.g., SOI+RF_JMR) prior to sending the combined jammer and SOI signal to Optical System 350 for interference cancellation. For example, RF Subsystem 310 may be configured to perform some initial cancellation of the jammer signal (e.g., RF_JMR) from the combined jammer and SOI signal (e.g., SOI+RF_JMR) prior to sending the signal to Optical Subsystem 350. RF Subsystem 310 may also perform other signal processing and filtering on the combined jammer and SOI signal (e.g., SOI+RF_JMR) as is described with respect to FIG. 3C prior to sending the combined jammer and SOI signal (e.g., SOI+RF_JMR) to Optical Subsystem 350. The signal representing the combined jammer and SOI signal (e.g., SOI+RF_JMR) sent from RF Subsystem 310 to Optical Subsystem 350 may be represented as RF_in2.

Optical Subsystem 350 may receive a copy of the (e.g., pre-processed) jammer signal (e.g., RF_in1) and a copy of the (e.g., pre-processed) combined jammer and SOI signal (e.g., RF_in which may correspond to the combined jammer plus SOI signal—SOI+RF_JMR) from RF Subsystem 310. Optical Subsystem 350 may be configured to cancel most or all of the interferer signal (e.g., RF_in1) from the combined jammer and SOI signal (e.g., RF_in2). The optical interference cancellation process may be described in more detail with respect to FIG. 3B. Generally, each of the interferer signal (e.g., RF_in1) and the combined jammer and SOI signal (e.g., RF_in2) may be converted from the RF domain to the optical domain. One of the two signals (e.g., RF_in1 or RF_in2) may be inverted during the optical conversion process. One or more optical paths (e.g., an optical path may include one or more optical attenuators and one or more optical delay lines) may be used to attenuate and/or delay the optically converted jammer signal. Optical Subsystem 350 may be controlled by Digital Subsystem 380 to variably attenuate and/or delay the optical version of the jammer signal to achieve maximum cancellation. Digital Subsystem 380 may control the variable attenuation and or variable delays applied by Optical Subsystem 350 based on the output of Optical Subsystem 350 and processing performed by RF Subsystem 310.

The variably attenuated and variably delayed optical version of the jammer signal may then be combined with the optically converted combined jammer and SOI signal. One of the variably attenuated and variably delayed optical version of the jammer signal and the optically converted combined jammer and SOI signal may be inverted prior to being combined by Optical Subsystem 350. The resultant signal may be an optical version of the SOI (or nearly so), provided that correct attenuation and/or delays were applied to the optical jammer system. The optical version of the SOI may then be converted back to the RF domain and output by Optical Subsystem 350 for further processing by RF Subsystem 310. RF Subsystem 310 may perform further processing on the output of Optical Subsystem 350 in order to provide additional information that may be used by Digital Subsystem 380 for controlling Optical Subsystem 350. The RF version of the SOI signal may then be sent from RF Subsystem 310 to Radio Transceiver 308.

Figure 3B:
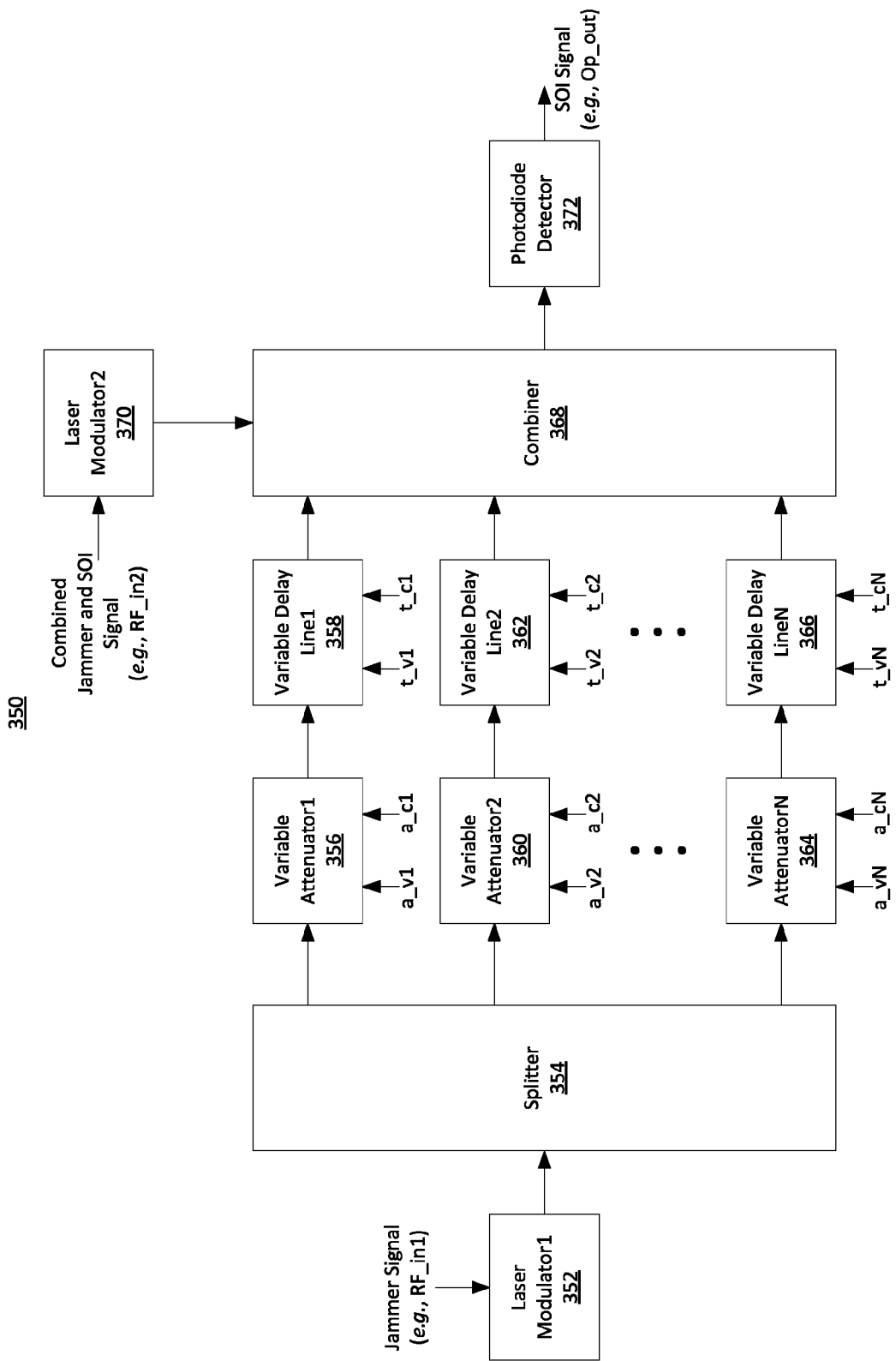
FIG. 3B illustrates an example architecture of an Optical Subsystem of an ICS.

FIG. 3B illustrates an example architecture of Optical Subsystem 350. The RF jammer signal (e.g., RF_in1) may be received from RF Subsystem 310 via Laser Modulator1 352. The terms laser modulator, optical modulator, and/or optical transmitter module may be used interchangeably herein. For example, Laser Modulator1 352 may be a laser modulator that performs a −180 degree optical phase shift on the jammer signal (e.g., RF_in1) during the RF-to-optical conversion process. The result of the −180 phase shift to the jammer signal during RF-to-optical conversion may be referred to herein as the optically inverted jammer signal. The RF-to-optical conversion may be realized using one or more laser modulators. In an example, the optical transmitters/laser modulators may utilize a counter phase Mach-Zehnder modulator (MZM) in order to convert the RF signal to optical signals. In another example, the optical transmitters/laser modulators may utilize direct modulation from RF to optical as described herein. Laser Modulator1 352 may provide RF amplitude and phase tracking, minimal DC offset, and/or reduced distortion at the Photodiode Detector output (e.g., output of Photodiode Detector 372). The phase shifter (e.g., −180 phase shift) may be implemented as part of Laser Modulator1 352 and/or may be a separate component.

The optically inverted jammer signal output from Laser Modulator1 352 may be sent to Splitter 354. For example, the optically inverted jammer signal may be split into a plurality of separate optical processing paths for further processing. Each optical processing path may be individually attenuated and/or individually delayed. For example, a first optical processing path from Splitter 354 may include Variable Attenuator1 356 and/or Variable Delay Line1 358. The variable attenuation and variable delay utilized by the optical processing paths of Optical Subsystem 350 are described in more detail below. Control signals that control the operation of the components of the first optical processing path (e.g., Variable Attenuator1 356 and/or Variable Delay Line1 358) may be provided by Digital Subsystem 380. For example, a_c1 may be a control signal from Digital Subsystem 380 that controls the amount by which Variable Attenuator1 356 attenuates the optically inverted jammer signal sent from Splitter 354 over the first optical processing path. Similarly, t_c1 may be a control signal from Digital Subsystem 380 that controls the amount by which Variable Delay Line1 358 delays the optically inverted jammer signal sent from Splitter 354 over the first optical processing path. The amount of attenuation and/or the amount of time delay may be controlled in order to achieve a desired or maximum amount of interference cancellation.

As may be appreciated, embodiments contemplate that the optically inverted jammer signal may be split by Splitter 354 into any number of separate optical processing paths for attenuation and delay based on the desired level of cancellation and operating environment. For example, each optical processing path (e.g., an optical attenuator and/or an associated optical delay line) may be used to cancel a different interference signal(s) and/or different components of an interfering signal. For example, a first optical processing path may be configured to cancel the direct line interferer signal. A second optical processing path may be configured to cancel a first multipath propagation of the interferer signal. An Nth (e.g., where N may be an integer) optical processing path may be configured to cancel an Nth multipath propagation of the interferer signal, etc. In an example, each optical processing path may be configured to cancel a different interferer. The optical attenuation weight and/or the optical delay line weight of each of the optical processing paths may be different depending on the type of cancellation desired.

Each optical processing path may be associated with different control signals from Digital Subsystem 380. For example, a second optical processing path may include Variable Attenuator2 360 and/or Variable Delay Line2 362. An Nth optical processing path may include Variable AttenuatorN 364 and/or Variable Delay LineN 366. Digital Subsystem 380 may control the operation of the components of each of the optical processing paths to achieve a desired level of interference cancellation. For example, Variable Attenuator1 356 may be controlled with signal a_c1, Variable Attenuator2 360 may be controlled with signal a_c2, and/or Variable AttenuatorN 364 may be controlled with signal a_cN. Similarly, Variable Delay Line1 358 may be controlled with signal t_c1, Variable Delay Line2 362 may be controlled with signal t_c2, and/or Variable Delay LineN 366 may be controlled with signal t_cN.

Power may be provided to the components of Optical Subsystem 350 by Power Supply 304. In an example, the power may be routed to the components of Optical Subsystem 350 from RF Subsystem 310 and/or from Digital Subsystem 380. In an example, there may be a direct connection from Power Supply 304 to Optical Subsystem 350. The power signal for Variable Attenuator1 356 may be signal a_v1, the power signal for Variable Attenuator2 360 may be signal a_v2, and the power signal for Variable AttenuatorN 364 may be signal a_vN. The power signal for Variable Delay Line1 358 may be signal t_v1, the power signal for Variable Delay Line2 362 may be signal t_v2, and the power signal for Variable Delay LineN 366 may be signal t_vN. Power Supply 304 may also supply power to one or more other components of Optical Subsystem 350, for example one or more of Laser Modulator1 352, Splitter 354, Combiner 368, Laser Modulator2 370, Photodiode Detector 372, and/or the like.

In an example, the optically inverted jammer signal may be processed by one or more optical processing paths prior to being combined with an optically converted version of the combined jammer and SOI signal. For example, the combined jammer+SOI signal (e.g., RF_in2) may be converted from RF to the optical domain by Laser Modulator2 370. Laser Modulator1 352 and Laser Modulator2 370 may be two matched laser modulators such that coherent optical cancellation may be performed. For example, Laser Modulator1 352 may be configured to invert the jammer signal during the RF-to-optical conversion process such that the optically inverted jammer signal may be combined optically with the optically converted combined jammer and SOI signal to result in cancellation of the RF_JMR signal such that the SOI signal can be isolated. An optical signal that is optically phase shifted by −180 degrees that is combined with an unshifted version of the same optical signal may result in complete destructive interference/complete cancellation if the phase shift is ideal. Phase shifting in the optical domain may achieve near ideal results across a wide frequency range.

Thus, after the optically inverted jammer signal is processed by the variable attenuator(s) and/or variable delay line(s), for example to properly scale and time-align the optically inverted jammer signal with the optically converted combined jammer and SOI signal, the output of the optical processing lines may be combined with the optically converted combined jammer and SOI signal at Combiner 368. If values for variable attenuation and/or variable delays were properly selected, the combining of the optical signals should result in the cancellation of the jammer signal from the combined jammer and SOI signal. This optical version of the SOI signal may be sent to Photodiode Detector 372 for further processing and conversion back to the RF domain. The SOI signal (e.g., Op_out) may then be sent back to RF Subsystem 310 for further processing. For example, signal Op_out may be tested to determine whether a desired level of interference cancellation has been achieved. An RF Correlator/Detector 338 (e.g., FIG. 3C) may be used to determine the level of interference cancellation, for example by associating the relative power level of the Op_out signal with the level of interference cancellation. Digital Subsystem 380 may determine whether the signal output from the optical subsystem representing the SOI signal (e.g., Op_out) meets a threshold signal-to-noise (SNR) level. For example, if the Digital Subsystem determines that the SNR of the Op_out signal is 10 dB or greater, then it may be determined that the interference from the jammer has been sufficiently cancelled and the resultant SOI signal (e.g., Op_out) may be sent to the radio Transceiver 308 (e.g., FIG. 3A).

Figure 3C:
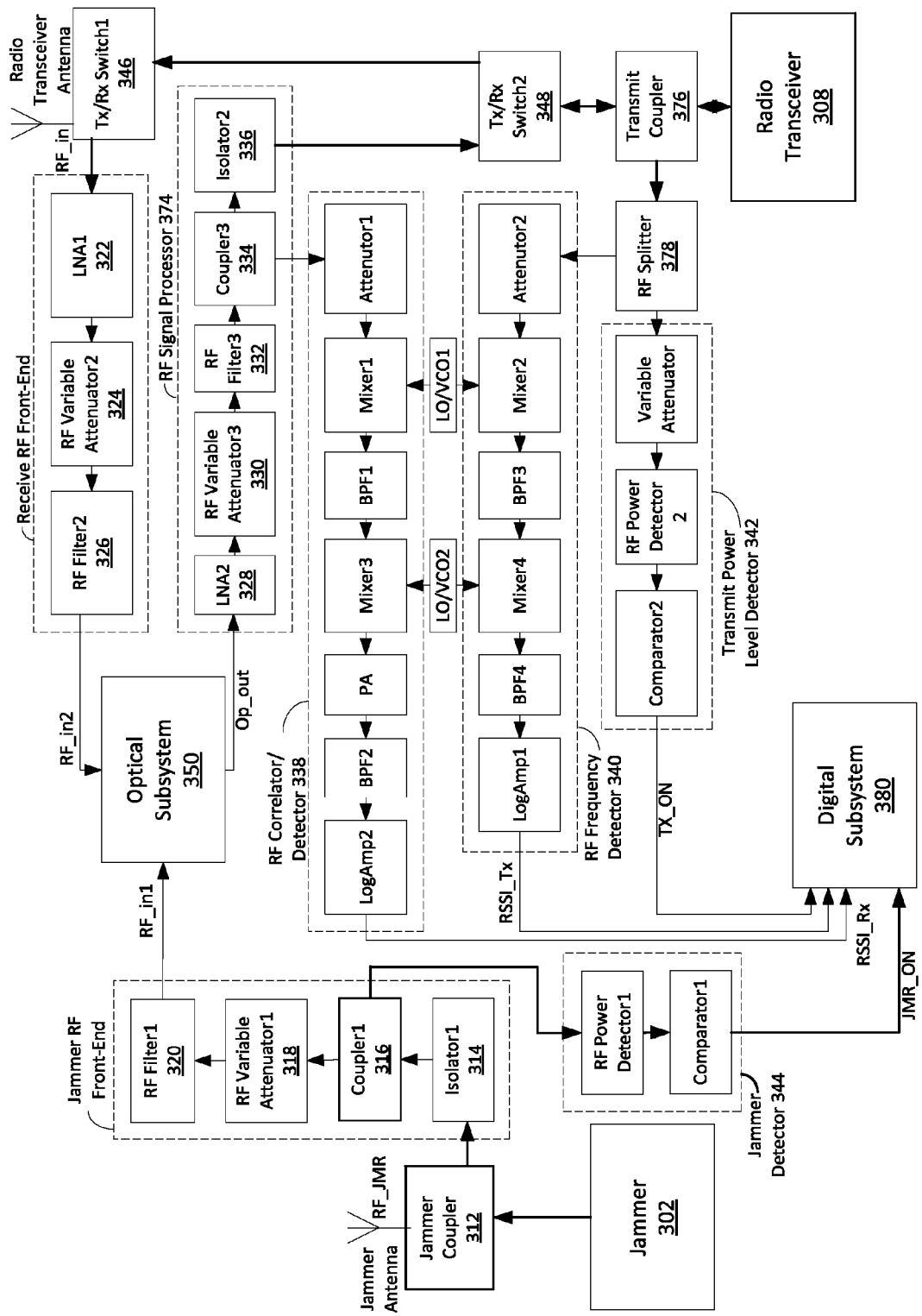
FIG. 3C illustrates an example architecture of an RF Subsystem of an ICS.

FIG. 3C is an example system diagram of RF processing components that may be included in RF Subsystem 310. For example, an interferer signal may be sent from Jammer 302 to Jammer Coupler 312. Jammer Coupler 312 may split the interferer signal from Jammer Coupler 312 such that the signal may be transmitted via the jammer antenna and a sample or copy of the signal may be used for interference cancellation by the ICS. Jammer Coupler 312 may provide an accurate sample of the jammer signal to the Jammer RF Front-End Processing components. Jammer Coupler 312 may be an RF coupler, for example with a coupling factor in the range of 20 to 50 dB depending on the jammer output power. In an example, a sample of the jammer signal may be obtained using a current probe that is operably coupled to the jammer antenna.

Jammer Coupler 312 may send a sample of the jammer signal to be transmitted over the jammer antennas to one or more jammer RF front-end processing components. Example RF front-end processing components may include one or more of variable attenuator(s), a low noise amplifier(s), RF bandpass filter(s), coupler(s), isolator(s) and/or tunable RF filter(s). The jammer RF front-end components may be configured to filter the jammer signal prior to processing by the Optical Subsystem. For example, Jammer RF Front End may be configured to prevent the generation of additional harmonics and/or intermods of the jammer signal within the ICS.

For example, as illustrated in FIG. 3C, a copy of the jammer signal may be received at Isolator1 314 of the jammer RF front-end. Isolator1 314 may be a passive device that may be used to prevent jammer and/or other RF signals from being affected by excessive signal reflection from the RF processing components and/or to control the direction of signal flow in the RF subsystem. Isolator1 314 may pass a copy of the jammer signal to Coupler1 316. Coupler1 316 may be configured to send a copy of the jammer signal to Jammer Detector 344. Jammer Detector 344 may be configured to detect when the jammer is in operation. For example, when the jammer is in use, Jammer Detector 344 may indicate to Digital Subsystem 380 that the jammer is on using signal JMR_ON. The ICS (e.g., Digital Subsystem 380) may be configured to determine to begin interference cancellation based on the concurrent detection of Jammer transmission (e.g., based on JMR_ON) and lack of transmission by Radio Transceiver 308.

Jammer Detector 344 may be configured to automatically detect when the Jammer begins transmission. For example, Jammer Detector 344 may include an RF Power Detector (e.g., RF Power Detector1) and/or a comparator (e.g., Comparator1). The comparator may be used to set the threshold power level used to determine whether Jammer 302 is currently transmitting/operating. The comparator may be an RF component that compares two voltages and/or two currents and outputs an indication of which of the two inputs are larger. For example, the comparator may set a power level threshold, above which it is assumed Jammer 302 is in operation, below which it is assumed that Jammer 302 is not in operation. RF Power Detector1 of Jammer Detector 344 may be configured to detect the jammer signal and/or the power level of the jammer signal and send an indication of the power level to comparator1 of Jammer Detector 344. The comparator1 may be configured to compare the received power level to a power level threshold. For example, the power level threshold may be +24 dBm, although the power level may vary depending on the configuration and properties of Jammer 302. If the received power level exceeds the power level threshold, then Comparator1 of Jammer Detector 344 may send an indication that Jammer 302 is currently transmitting to Digital Subsystem 380, for example via the JMR_ON signal. If the received power level does not exceed the power level threshold, then Comparator1 of Jammer Detector 344 may send an indication that Jammer 302 is not currently transmitting (e.g., is turned off) to Digital Subsystem 380, for example via the JMR_ON signal.

One or more jammer RF front-end components may be configured to perform initial interference cancellation processing on the jammer signal prior to further interference cancellation processing in Optical Subsystem 350. For example, RF Variable Attenuator1 318 may be a variable RF attenuator that is controlled by Digital Subsystem 380. For example, control signal CTRL_AT1 may be used by Digital Subsystem 380 to control RF Variable Attenuator 318 (e.g., not shown in FIG. 3C). By varying the attenuation level of RF Variable Attenuator1 318 prior to sending the jammer signal to Optical Subsystem 350, Digital Subsystem 380 may selectively perform initial interference cancellation processing in the RF domain prior to further processing in the optical domain. Control of RF Variable Attenuator 318 by Digital Subsystem 380 (e.g., using CTRL_AT1) may be based on feedback received by Digital Subsystem 380 from one or more of RF Correlator/Detector 338, RF Frequency DetectorRSSI 340, and/or Transmit Power Level Detector 342. The variably attenuated RF jammer signal may then be sent to RF Filled 320. RF Filter1 320 may include one or more of a fixed RF filter and/or a variable RF filter for processing the jammer signal. RF Filter1 320 may send the preprocessed jammer signal (e.g., RF_in1) to optical subsystem 350 for further interference cancellation processing.

Transmit/Receive Switch1 346 may be operably coupled to Antenna2 306 and may send SOI+RF_JMR to the Receive RF Front-End component of the RF Subsystem. The Receive RF Front-End components may include one or more variable/tunable attenuator(s), low noise amplifier(s) (LNAs), fixed RF filer(s), and/or variable RF filter(s). For example, LNA1 322 may amplify the signal received via Antenna2 306 and send the amplified signal to RF Variable Attnuator2 342. RF Variable Attnuator2 342 may be a controllable/tunable attenuator that is controlled by Digital Subsystem 380, for example using control signal CTRL_AT2. Digital Subsystem 380 may be configured to vary the attenuation level of RF Variable Attenuator2 342 in order perform initial interference cancellation processing of the combined jammer and SOI signal. The variably attenuated jammer and SOI signal may then be send to RF Filter2 326. RF Filter2 326 may include a fixed RF bandpass filter and/or tunable RF filter to process and filter the combined jammer and SOI signal prior to processing in Optical Subsystem 350. The RF pre-processed combined jammer and SOI signal (e.g., RF_in2) may then be sent to Optical Subsystem 350 for further interference cancellation processing.

Optical Subsystem 350 may receive the RF pre-processed jammer signal (e.g., RF_in1) and the RF pre-processed combined jammer and SOI signal (e.g., RF_in2), may convert the signals from the RF domain to the optical domain, and may perform further interference processing (e.g., variable attenuation and/or inserting variable time delays) prior to combining the optically converted signals to achieve interference cancellation (See e.g., FIG. 3B). The resultant signal representing the SOI may be converted back to the RF domain and sent to RF Signal Processor 374 (e.g., signal Op_out). Op_out may represent any residual interference signal(s) present at the photodiode detector output (e.g., if the interferer signal was not completely cancelled) and the SOI, and Op_out may be sent to RF Signal Processor 374. The SOI and the residual jammer signal at the output of Optical Subsystem 350 (e.g., Op_out) may be processed and filtered by RF Signal Processor 374 prior to being sent to one or more of RF Correlator/Detector 338 (e.g., an RF Power Meter) and/or Transmit/Receive Switch2 348.

RF Signal Processor 374 may include one or more of fixed RF filter(s), low noise amplifier(s) (LNA(s)), fixed attenuator(s), variable attenuator(s), coupler(s), isolator(s), and/or other RF processing components, for example depending on the application of the ICS. RF Signal Processor 374 may be configured to process the output of Optical Subsystem 350 with minimal effect on the SOI. For example, when Optical Subsystem 350 acts to cancel the interferer signal to obtain a clean version of the SOI, Optical Subsystem may introduce noise and/or attenuate the signal of interest during the interference cancellation process. In order to provide additional gain to the SOI after cancellation, RF Signal Processor 374 may be applied to the output of Optical Subsystem 350. For example, RF Signal Processor 374 may utilize LNA2 328 to increase the power level of the SOI without further accentuating the noise that may have been introduced to the signal. In an example, RF Signal Processor 374 (e.g., and/or one or more of the receive RF front-end components or the jammer RF front-end components) may be configured to be linear devices in order to avoid introducing distortion to the signal of interest.

After processing by LNA2 328, the signal representing the SOI plus any residual interference may be sent to RF Variable Attenuator3 330. RF Variable Attenuator3 330 may be a variable attenuator controlled by Digital Subsystem 380, for example using control signal CTRL_AT3. Digital Subsystem 380 may variably attenuate the signal representing the SOI plus any residual interference using RF Variable Attenuator3 330, for example to determine when Radio Transceiver 308 is operating in transmit mode. The variably attenuated signal representing the SOI plus any residual interference may then be filtered by RF Filter3 334 to further remove one or more noise components that may have been introduce by optical Subsystem 350. The signal representing the SOI plus any residual interference may then be sent to Coupler3 334, which may send a copy of the signal to each of RF Correlator/Detector 338 and/or Isolator2 336. Isolator2 336 may isolate the RF signal (e.g., prevent reflection, etc.), and send a copy of the signal to Transmit/Receive Switch 348. Depending on the configuration and/or current mode of operation of the ICS, the signal (which may represent the SOI if most or all of the interferer signal was successfully cancelled) may be passed to Radio Transceiver 308 for further processing.

RF Signal Processor 374 may send the filtered SOI and residual interference signal to RF Correlator/Detector 338. RF Correlator/Detector 338 may send an RF correlator output signal (e.g., RSSI_Rx) to Digital Subsystem 380. The RF correlator output signal may be used by Digital Subsystem 380 to control the amplitude of one or more variable attenuators (e.g., RF variable attenuators and/or optical variable attenuators of Optical Subsystem 350) and/or time delay and/or phase of variable time delay units. The signal RSSI_Rx may be a received signal strength indication (RSSI) of any resultant interference signal as detected by the RF Correlator/Detector (e.g., plus the SOI). For example, the signal RSSI_Rx may be considered a measure of the cancellation depth of the ICS. For example, when RSSI_Rx is minimized, the cancellation depth of the ICS may be considered to be maximized (e.g., the cancellation of the jammer signal may be maximized). When RSSI_Rx is high or maximized, the cancellation depth of the ICS may be considered to be minimal (e.g., the jammer signal may be essentially uncancelled). Thus, the signal RSSI_Rx may be considered a measure of the dynamic range of the ICS.

In an example, RF Correlator/Detector 338 may include one or more mixers with integrated synthesizers, fixed RF attenuators, bandpass filters, and/or LogAmps. The output signal RSSI_Rx may be measured continually during cancellation to determine the residual content of the cancelled jammer signal. If the signal RSSI_Rx is minimized, Digital Subsystem 380 may determine that the cancellation of the jammer has been maximized. When a cancellation threshold for RSSI_Rx is detected by Digital Subsystem 380 (e.g., the power level of RSSI_Rx falls below a threshold), Digital Subsystem 380 may control Transmit/Receive Switch 2 to send the clean SOI signal to Radio Transceiver 308 for signal processing and reception.

Digital Subsystem 380 may be configured to implement a control loop that utilizes the output of RF Correlator/Detector 338 as feedback for determining appropriate value for the attenuator gains and/or time delays of Optical Subsystem 350 and/or for the attenuation gains of one of more RF variable attenuators. These parameters may be stepped and/or varied in order to minimize RF Correlator/Detector 338 output. Additionally, changes in RF Correlator/Detector 338 RSSI output levels detected in response to changes in attenuation and/or time delay may be used as feedback rather than or in addition to the overall magnitude of the RF Correlator/Detector 338 RSSI output. Since the SOI may be associated with power levels that are orders of magnitude smaller than that of the jammer signal (e.g., Jammer 302 may operate on the order of +50 dBm (e.g., −5 dBm per 25 kHz channel) while the SOI may be on the order of −60 dBm or lower. Since RF Correlator/Detector 338 output may be considered a measure of RF power at the frequency of the SOI, reductions in the power level of RF Correlator/Detector 338 output may be mainly due to the cancellation of the jammer signal from the combined jammer plus SOI signal. DC offsets, if present in the control loop, may have little to no effect on the cancellation efficiency (e.g., do not reduce the cancellation efficiency) because, the DC offset may be constantly added to RF Correlator/Detector 338 output value and hence may not affect the difference in power levels utilized by the control loop during ICS operation. These DC offsets may be due to electronic component DC offsets as well as background noise presence in the RF signal at the input of the power meter. The interference cancellation attenuation may be a function of the power meter dynamic range and/or SOI bandwidth.

Although the ICS interfaces with Radio Transceiver 308 that is used to transmit and/or receive SOIs, the transmit output power and transmit frequency of Radio Transceiver 308 may be unknown to the ICS. For example, the ICS may be configured to be attached to wide range of radio types (e.g., utilizing different frequencies and/or bandwidths), and thus the ICS may be configured to determine the frequency of operation for a given Radio Transceiver 308 and/or to determine when Radio Transceiver 308 is in transmitting mode. In an example, the components of RF Subsystem 310 may be configured to automatically detect the transmit output power and frequency of Radio Transceiver 308. For example, Transmit Power Level Detector 342 may be configured to measure the transmit power of Radio Transceiver 308.

One or more of Transmit/Receive Switch1 346 and/or Transmit/Receive Switch2 348 may be controlled by Digital Subsystem 380 based on whether Radio Transceiver 308 is in transmit mode or receive mode. For example, when Radio Transceiver 308 begins to transmit (e.g., as detected by Transmit Power Level Detector 342), the signal to be transmitted may be sent from Radio Transceiver 308 to Transmit Coupler 376. Transmit Coupler 376 may send the signal to be transmitted to Transmit/Receive Switch2 348. Since Radio Transceiver 308 is in transmit mode, Digital Subsystem 380 may control Transmit/Receive Switch2 348 to send the transmit signal to Transmit/Receive Switch1 346. Since Radio Transceiver 308 is in transmit mode, Digital Subsystem 380 may control Transmit/Receive Switch1 346 to send the transmit signal to Antenna2 306 for transmission.

When Digital Subsystem 380 determines Radio Transceiver 308 is in receive mode (e.g., based on signals received from Transmit Power Level Detector 342), Digital Subsystem 380 may control the transmit/receive switches (e.g., Transmit/Receive Switch1 346 and/or Transmit/Receive Switch2 348) based on whether Jammer 302 is currently in operation. For example, if Radio Transceiver 308 is in receive mode (e.g., determined based on Transmit Power Level Detector 342 output) and Jammer 302 is on (e.g., determined based on Jammer Detector 344 output), Digital Subsystem 380 may control Transmit/Receive Switch1 346 to send the signal received via Antenna2 306 to receive RF front-end components for interference cancelation processing and may control Transmit/Receive Switch2 348 to send the output of RF signal Processor 374 to Transmit Coupler 376 for processing by Radio Transceiver 308. If Radio Transceiver 308 is in receive mode (e.g., determined based on Transmit Power Level Detector 342 output) and Jammer 302 is off (e.g., determined based on Jammer Detector 344 output), Digital Subsystem 380 may control Transmit/Receive Switch1 346 to send the signal received via Antenna2 306 directly to Transmit/Receive Switch2 348. Digital Subsystem 348 may then control Transmit/Receive Switch2 348 to send the output of RF signal Processor 374 to Transmit Coupler 376 for processing by Radio Transceiver 308.

In order to determine whether Radio Transceiver is transmitting and/or the frequency of operation of Radio Transceiver 308, Transmit Coupler 376 may send a copy of the signals to be transmitted to RF Splitter 378. RF Splitter 378 may split the transmission signal and forward the signal to RF Frequency Detector 340 and Transmit Power Detector 342.

RF Frequency Detector 340 may be configured to measure the received RF signal and/or a RF signal to be transmitted in order to determine the frequency of the signal. RF Frequency Detector 340 may include one or more mixer(s) with integrated synthesizer(s), fixed RF attenuator(s), bandpass filter(s), and/or LogAmp(s). RF Frequency Detector 340 may be configured to automatically detect the frequency by fast tuning of the synthesizers for a known, fixed frequency, which may be referred to as an IF frequency (e.g., an example IF fixed frequency may be 70 MHz). When a maximum output power is measured at the output of the LogAmp by Digital Subsystem 380, input frequency to RF Frequency Detector 340 may be determined by Digital Subsystem 380 based on knowledge of the known, fixed IF frequency and the current tuning levels of the local oscillators (e.g., components of the synthesizers).

The RSSI_TX signal may be received by Digital Subsystem 380 from RF Frequency Detector 340, and Digital Subsystem 380 may determine the frequency of the input of RF Frequency Detector 340 based on RSSI_TX and the tuning levels of the synthesizers. Transmit Power Level Detector 342 may be configured to automatically determine the transmission power of a signal being transmitted via Antenna 2 306. Transmit Power Level Detector 342 may include one or more variable attenuator(s), an RF power detector(s), and/or comparator(s). The signals TX_ON and RSSI_TX may be utilized by Digital Subsystem 380 to determine parameters associated with Radio Transceiver 308 (e.g., power level and/or frequency) used for transmitting via Antenna2 306. If the transmit and receive frequencies are the same for Radio Transceiver 308, the knowledge of the transmit frequency may be used to effectively cancel the jammer at that frequency.

Figure 3D:
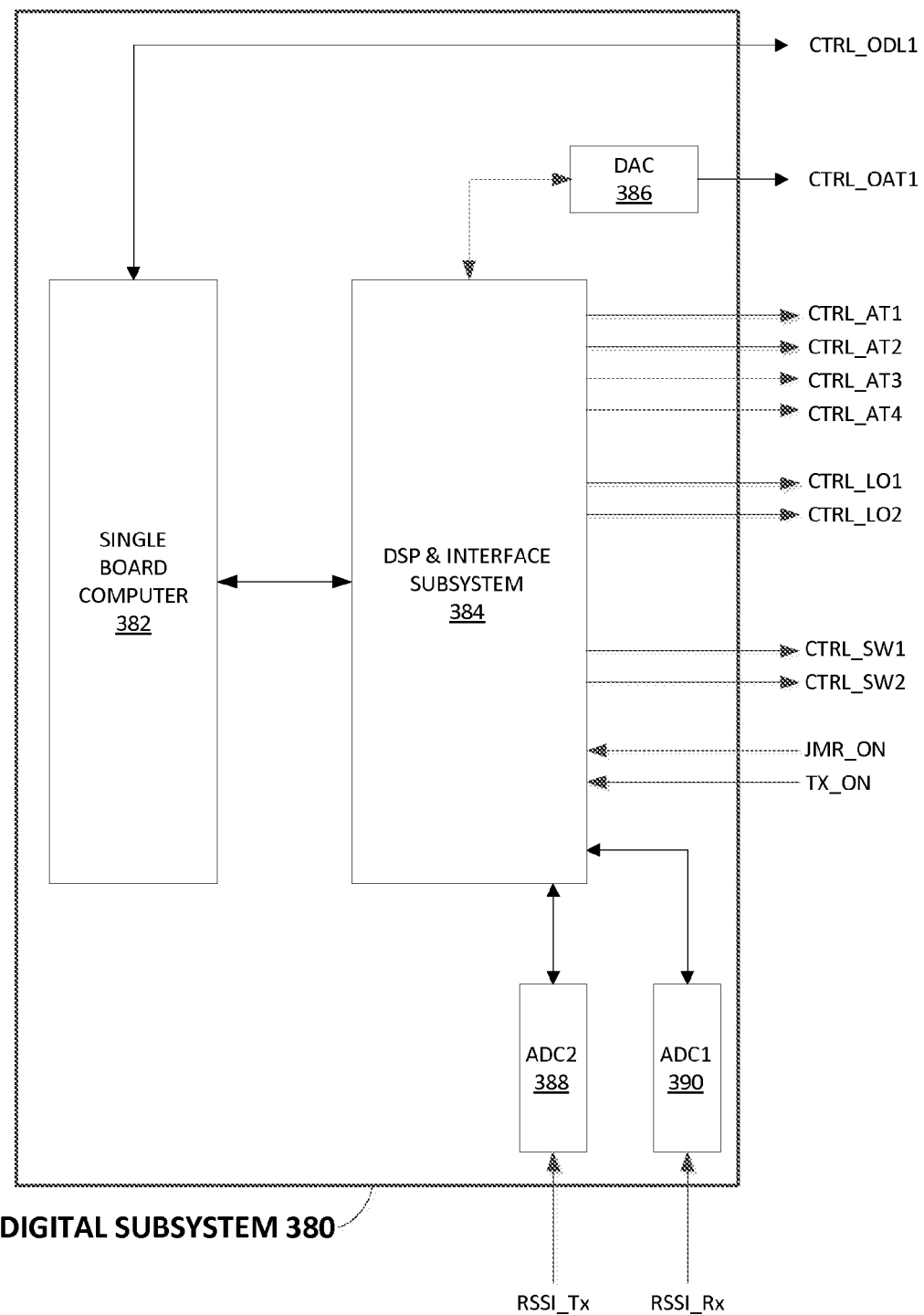
FIG. 3D illustrates an example architecture of a Digital Subsystem of an ICS.

FIG. 3D is a block diagram illustrating example components and example signals associated with Digital Subsystem 380. For example, Digital Subsystem 380 may include one or more field programmable gate array (FPGA)-Digital Signal Processing (DSP) circuits with a plurality of input and/or output (I/O) interfaces (e.g., DSP & Interface Subsystem 384). DSP & Interface Subsystem 384 may be an integrated circuit that may be configured to send and/or receive control signals in order to implement one or more of the methods and techniques described herein. For example, DSP & Interface Subsystem 384 may be configured to send and/or receive control signals to/from Optical Subsystem 350 and/or RF Subsystem 310. DSP & Interface Subsystem 384 may be implemented on a FPGA to implement control logic.

DSP & Interface Subsystem 384 may include Single Board Computer 382. Single Board Computer 382 may include a processor and/or memory. For example, Single Board Computer 382 may be configured to implement one or more of the methods and/or techniques described herein. For example, the memory of the Single Board Computer 382 may include processor readable instructions. The processor readable instructions may be executed by the processor in order to carry out one or more of the control methods described herein. For example, the control methods may include control of one or more RF components of the RF subsystem, control of one or more of the optical components of the optical subsystem, and/or control of components within Digital Subsystem 380 (e.g., DSP & Interface Subsystem 384). The memory of the Single Board Computer 382 may include any tangible and/or physical memory such as random access memory (RAM), read-only memory (ROM), volatile memory, and/or non-volatile memory. For example, the computer readable instructions may be loaded into RAM in the Single Board Computer and the instructions may be executed by the processor in order to perform one or more of the functions and/or methods described herein.

In an example, Digital Subsystem 380 may be configured to convert the signal RSSI_Rx from RF Subsystem 310 from the analog domain to digital domain, for example using an analog-to-digital converter (e.g., ADC1 390). Similarly, Digital Subsystem 380 may be configured to convert the signal RSSI_Tx from LogAmp2 442 of the RF Subsystem from the analog domain to digital domain, for example using an analog-to-digital converter (e.g., ADC2 388). In an example, the digital control signal for one or more of the optical attenuators included in Optical Subsystem 350 may be controlled by Digital Subsystem 380 using control signal CTRL_OAT1. Digital-to-analog converter (DAC) 386 may be utilized in order to control one or more optical attenuators of Optical Subsystem 350. The control signal CTRL_ODL1 may be generated by Single Board Computer 382 for the control of one or more optical delay lines of Optical Subsystem 350. As may be appreciated, although a single control signal for the attenuators of the optical weighting network of Optical Subsystem 350 is shown in FIG. 3D (e.g., CTRL_OAT1), more than one control signal may be used, for example to control the one or more optical attenuators. For example, CTRL_OAT1 may include the signals a_c1, a_c2, . . . , a_cN etc. Similarly, although a single control signal for the delay lines of the optical weighting network of Optical Subsystem 350 is shown in FIG. 3D (e.g., CTRL_ODL1), more than one control signal may be used, for example to control the one or more optical delay lines. For example, CTRL_ODL1 may include the signals t_c1, t_c2, . . . , t_cN etc.

The determination of when to begin or stop cancellation may be based on whether the jammer is currently in operation. For example, Digital Subsystem 380 may be configured to receive the signal JMR_ON from the RF Subsystem. The frequency of operation of the transceiver may be determined and/or measured by the Digital Control Subsystem. For example, the frequency of operation of the transceiver may be determined and/or measured by the Digital Subsystem based on the signal TX_ON, which may be received from the RF Subsystem.

Digital Subsystem 380 may be configured to send the control signals CTRL_SW1 and CTRL_SW2, for example to control Transmit/Receive Bypass Switch 1 and Transmit/Receive Bypass Switch 2, respectively. Digital Subsystem 380 may be configured to control the fast tuning of the first local oscillator (e.g., LO1/VCO1 426), for example using control signal CTRL_LO1. Digital Subsystem 380 may be configured to control the fast tuning of the second local oscillator (e.g., LO2/VCO2 428), for example using control signal CTRL_LO2.

Digital Subsystem 380 may be configured to control one or more of attenuation levels of various RF and/or optical attenuators. For example, Digital Subsystem 380 may be configured to control Variable RF Attenuator1 318 in the Jammer RF Front-End component of the RF Subsystem, for example by sending signal CTRL_AT1 to Variable RF Attenuator1 318. Digital Subsystem 380 may be configured to control Variable RF Attenuator2 324 in the Receive RF Front-End component of the RF Subsystem, for example by sending signal CTRL_AT2 to Variable RF Attenuator2 324. Digital Subsystem 380 may be configured to control Variable Attenuator 3 in the RF Signal Processor component of the RF Subsystem (e.g., Variable Attenuator of Transmit Power Level Detector 342), for example by sending signal CTRL_AT3 to Variable Attenuator 3. Digital Subsystem 380 may be configured to control Variable Attenuator 4 in the Transmit Power Level Detector of the RF Subsystem, for example by sending signal CTRL_AT4 to Variable Attenuator 4.

Figure 4:
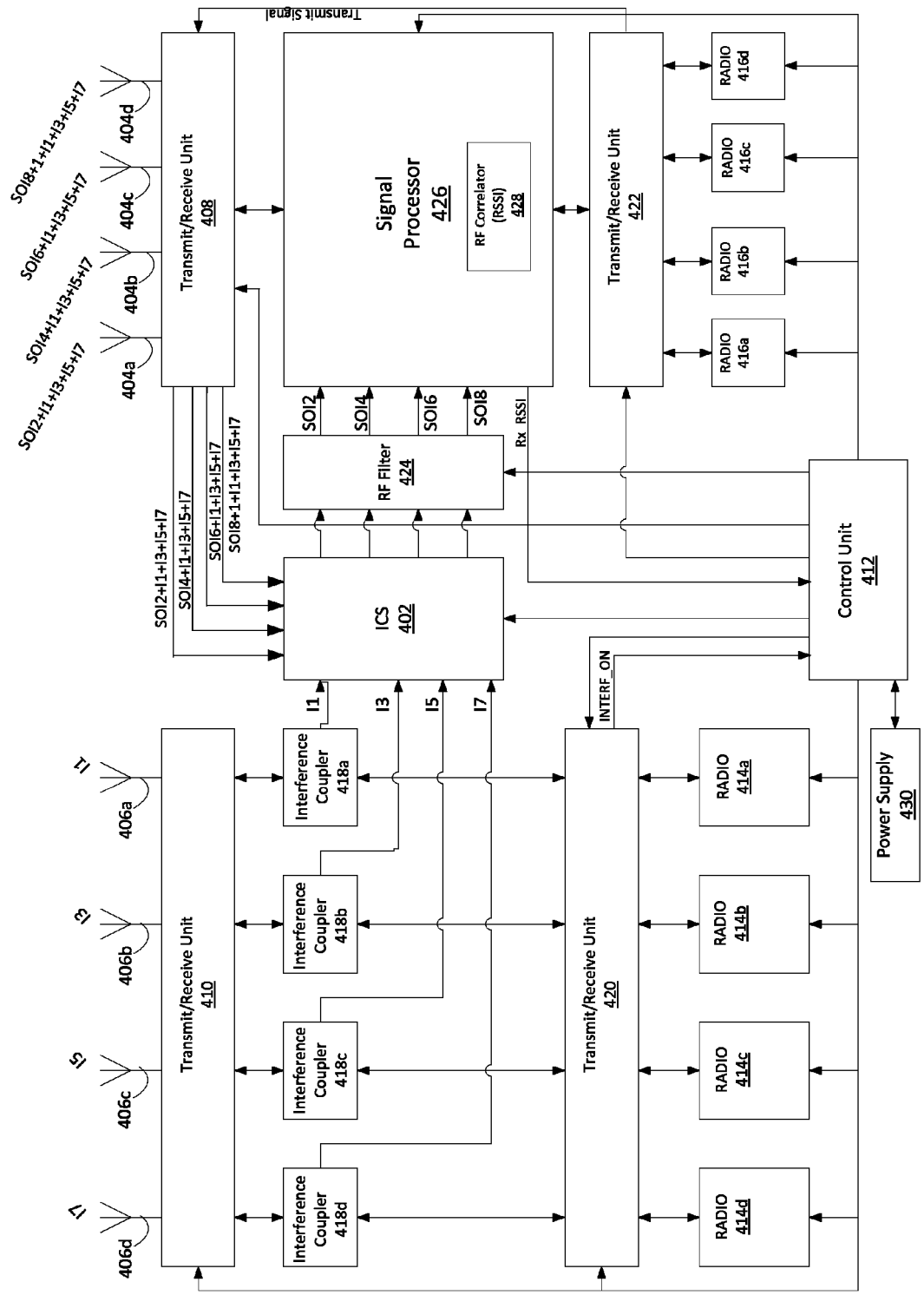
FIG. 4 is a diagram that depicts an example architecture that may be implemented for cancelling interference from multiple interferers.

FIG. 4 is a diagram that depicts an example architecture for cancelling interference received in one or more radio signals. The architecture may be implemented using a combination of electronic hardware and signal processing and control. One or more portions of the architecture depicted in FIG. 4 may be implemented at a receiving device that may receive one or more SOIs via a communications network. The receiving device may also receive one or more signals that may cause interference with the one or more SOIs. One or more portions of the architecture depicted in FIG. 4 may be implemented to cancel the interference, such that the receiving device may properly provide the one or more SOIs to an end user of the receiving device.

As shown in FIG. 4, one or more radios 416a, 416b, 416c, 416d may be configured to transmit and/or receive RF signals. The signals may be transmitted and/or received via one or more of antennas 404a, 404b, 404c, 404d. The signals may be transmitted from and/or received at the corresponding radio 416a, 416b, 416c, 416d via a transmit/receive unit 408, a signal processor 426, and/or a transmit/receive unit 422. Signals being transmitted from one or more of the radios 416a, 416b, 416c, 416d may bypass the signal processor 426, as the signal processor 426 may be used for processing incoming signals. The transmit/receive units 408, 422 may include a transmitter, a receiver, a transceiver, and/or any other device capable of transmitting and/or receiving RF signals.

The transmit/receive unit 408 may include an RF receive tunable front-end and transmit/receive switch. The RF receive tunable front-end may include a low noise amplifier to increase the gain of incoming or outgoing signals. The RF receive tunable front-end may include a tunable attenuator for varying the power level of the incoming and/or outgoing signals. A tunable RF bandpass/lowpass/bandstop filter may be included in the RF receive tunable front-end that may separate the transmitted and/or received SOI from harmonics and/or intermods. The RF receive tunable front-end may include an RF equalizer circuit for correction of non-linear portions of the amplitude and/or phase of the incoming signals. The transmit/receive switch may direct any incoming or outgoing signal to a corresponding transmit path or receive path of the ICS or to the same corresponding paths of any subsystem connected to the ICS, such as the radios 416a, 416b, 416c and 416d in FIG. 4.

The transmit/receive unit 422 may include a tunable RF band-pass filter (BPF) and transmit/receive switch. The tunable RF band-pass Filter (BPF) isolates the transmitted or received signal(s) from unwanted harmonics and intermods, which may affect the expected quality of the SOI. The transmit/receive switch directs the incoming or outgoing signal to the corresponding transmit path or receive path for each radio. The tunable RF BPF may isolate the transmitted and/or received signal(s) from unwanted harmonics and/or intermods, which may affect the expected quality of the SOI. The transmit/receive switch may direct the incoming or outgoing signal to the corresponding transmit path or receive path for each radio.

Each radio 416a, 416b, 416c, 416d may use a respective antenna 404a, 404b, 404c, 404d to transmit and/or receive signals. Each radio 416a, 416b, 416c, 416d may transmit and/or receive on a different frequency or frequency band. The signals may include data to be provided to an end user. The data may include audio data, text, picture data, video data, or any other data that may be communicated to an end user via RF signals. The data may be communicated to one or more radios 416a, 416b, 416c, 416d from the one or more sources via a signal which may be referred to as an SOI. The SOI received at antennas 404a, 404b, 404c, 404d may be indicated by SOI2, SOI4, SOI6, SOI8, respectively. While the example illustrated in FIG. 4 shows four receiving radios 416a, 416b, 416c, 416d, any number of receiving radios may be implemented.

One or more of radios 414a, 414b, 414c, 414d may transmit respective interfering signals I1, I3, I5, I7 that may interfere with one or more of the SOI2, SOI4, SOI6, SOI8 being sent to the one or more radios 416a, 416b, 416c, 416d. For example, the radios 414a, 414b, 414c, 414d may be jammers that may attempt to jam signals being transmitted on one or more frequencies. The interfering signals I1, I3, I5, I7 may be transmitted to disrupt other forms of communication, but may unintentionally disrupt one or more of the SOI2, SOI4, SOI6, SOI8. For example, the interference signals I1, I3, I5, I7 may be high power, broad band signals that may be transmitted to block or interfere with signals being transmitted from a remote source (not shown). The signals transmitted from the remote source may include hostile enemy communications that may be sent to detonation devices, such as mines or IEDs, or other devices that may receive enemy communication signals.

The interfering signals I1, I3, I5, I7 may be transmitted from the radios 414a, 414b, 414c, 414d via a transmit/receive unit 420, interference couplers 418a, 418b, 418c, 418d, a transmit/receive unit 410, and/or antennas 406a, 406b, 406c, 406d. The transmit/receive units 410, 420 may include a transmitter, a receiver, a transceiver, and/or any other device capable of transmitting and/or receiving RF signals. The transmit/receive units 410, 420 may include a BPF tunable RF BPF and transmit/receive switch. The tunable RF BPF may isolate the desired signal from unwanted signals in the communications system, while the transmit/receive switch may direct incoming or outgoing signals to the corresponding transmit path or receive path for the radios connected to the ICS. Each interfering radio 414a, 414b, 414c, 414d may use a respective antenna 406a, 406b, 406c, 406d for transmission of interference. Each radio 414a, 414b, 414c, 414d may transmit on a different frequency or frequency band. While the example illustrated in FIG. 4 shows four interfering radios 414a, 414b, 414c, 414d, any number of interfering radios and/or receiving radios may be implemented.

The signals received at each antenna 404a, 404b, 404c, 404d may include an SOI, such as SOI2, SOI4, SOI6, or SOI8, and/or one or more interfering signals, such as I1, I3, I5, I7, which may be transmitted on one or more frequencies. The interfering signal I1 from radio 414a may be transmitted on frequency f1. The interfering signal I3 from radio 414b may be transmitted on frequency f3. The interfering signal I5 from radio 414c may be transmitted on frequency f5. The interfering signal I7 from radio 414d may be transmitted on frequency f7. The SOI2 directed to radio 416a may be transmitted on frequency f2. The SOI4 directed to radio 416b may be transmitted on frequency f4. The SOI6 directed to radio 416c may be transmitted on frequency f6. The SOI8 directed to radio 416d may be transmitted on frequency f8.

A control unit 412 may control the allocated frequency spectrum for the communications equipment. The control unit 412 may allocate the frequencies to radios 414a, 414b, 414c, 414d and/or radios 416a, 416b, 416c, 416d. The frequencies may be allocated within the instantaneous bandwidth of ~100 MHz or higher. The control unit 412 may allocate frequencies f1, f3, f5, f7 to radios 414a, 414b, 414c, 414d, respectively. The frequencies may be increased for each radio, such as where f1<f3<f5<f7 for example. The control unit 412 may allocate frequencies f2, f4, f6, f8 to radios 416a, 416b, 416c, 416d, respectively. The frequencies may be increased for each radio, such as where f2<f4<f6<f8 for example. The frequencies f1, f3, f5, f7 may be less than or equal to the frequencies f2, f4, f6, f8, such as where f1<f2, f3<f4, f5<f6, and f7<f8 for example.

The control unit 412 may provide control of one or more modules or functions in the communications system. For example, the control unit may communicate with and/or control the radios 414a, 414b, 414c, 414d, the radios 416a, 416b, 416c, 416d, the transmit/receive units 408, 410, 420, 422, an ICS 402, the signal processor 426, an RF filter 424, and/or a power supply 430. The control unit 412 may include a general purpose processor, a special purpose processor, a conventional processor, a digital signal processor (DSP), one or more microprocessors, a controller, a microcontroller, Application Specific Integrated Circuits (ASICs), Field Programmable Gate Array (FPGA) circuits, any other type of integrated circuit (IC), and/or the like. The control unit 412 may be implemented in the field, in the air, on naval ships, submarines, or in any other area in which wireless communications equipment may be implemented.

The control unit 412 may receive an indication (e.g., INTERF_ON) from the transmit/receive unit 420 that may indicate whether interference may be transmitted from one or more of the radios 414a, 414b, 414c, 414d. The indication may be a bit indicator that may indicate that the interference may be transmitted using one bit (e.g., '0' or '1') and may indicate that interference may not be transmitted using another bit (e.g., '0' or '1'). Upon receiving the indication, the control unit 412 may control one or more other modules within the system, such as the ICS 402, the RF filter 424, and/or the signal processor 426, to perform interference cancellation. The use of the ICS 402 may remain dormant until the control unit 412 detects interference from one or more of the radios 414a, 414b, 414c, 414d. Upon the detection of the interference from one or more of the radios 414a, 414b, 414c, 414d, the control unit 412 may power on the ICS 402 and/or provide instructions to the ICS 402 for filtering the interference from received signals. The use of the ICS 402 may be controlled to conserve resources, such as the power provided by the power supply 430.

The interference received at the transmit/receive unit 408 may be cancelled using the ICS 402. The ICS 402 may be a wideband optical ICS 402 that may convert RF and/or digital signals to optical signals for interference cancellation. While the ICS 402 may be described as an optical ICS, the ICS 402 may perform interference cancellation using other types of signals.

The ICS 402 may perform cancellation of the interfering signals I1, I3, I5, I7 based on samples of the interfering signals I1, I3, I5, I7. The samples of the interfering signals I1, I3, I5, I7 may be taken by the interference couplers 418a, 418b, 418c, 418d. Each interference coupler 418a, 418b, 418c, 418d may take a sample from the interference transmitted by a respective interferer radio 414a, 414b, 414c, 414d. Interference couplers 418a, 418b, 418c, 418d may be RF front-end interference couplers for the radios 414a, 414b, 414c, 414d. The interference couplers may send the sample to the ICS 402 for use in interference cancellation. The ICS 402 may determine that one or more of the interferers I1, I3, I5, I7 are causing the interference in the signal comprising one or more of the SOI2, SOI4, SOI6, SOI8 using the interference samples from the one or more of the couplers 418a, 418b, 418c, 418d. Once one or more of the interfering signals I1, I3, I5, I7 are determined, the ICS 402 may use the samples from the one or more interfering signals I1, I3, I5, I7 to cancel the interference.

The ICS 402 may access interference information for the interference signals I1, I3, I5, I7 from a local or a remote source. In a co-located communications system, the radios 414a, 414b, 414c, 414d that may be the source of the interference signals I1, I3, I5, I7 may be located within the same system as the radios 416a, 416b, 416c, 416d to which SOIs may be directed. The optical ICS 402 may access the interference information for the interference signals I1, I3, I5, I7 remotely, from one or more sources that may have knowledge of the interference information and may not be co-located with the radios 416a, 416b, 416c, 416d. Where the interference radios 414a, 414b, 414c, 414d that may be the source of the interference signals I1, I3, I5, I7 are located in a remote location, the interference information may be unknown to the ICS 402. When the interference information is unknown, the interference may be estimated, as described in U.S. patent application Ser. No. 13/899,529, filed May 21, 2013.

Each of the interfering signals I1, I3, I5, I7 may be combined with one or more of SOI2, SOI4, SOI6, SOI8 from a remote source when received at the transmit/receive unit 408. The transmit/receive unit 408 may provide the signals to the ICS 402 for interference cancellation. The signals may include one or more of the SOI2, SOI4, SOI6, SOI8 and one or more of the interference signals I1, I3, I5, I7. In another example, the transmit/receive unit 408 may provide the power levels of the signals to the optical ICS 402 for cancellation. The transmit/receive unit 408 may be made up of tunable attenuators very low noise amplifiers (LNAs) to provide one or more of the SOI2, SOI4, SOI6, SOI8 and the interference signals I1, I3, I5, I7 levels to the optical ICS 402 for cancellation.

The optical ICS 402 may remove one or more of the interference signals I1, I3, I5, I7 based on the received sampling of the interference signals I1, I3, I5, I7. For example, the optical ICS 402 may remove the interference signals I1, I3, I5, I7 over a wide and instantaneous bandwidth (e.g., 150 MHz). The interference may be removed without appreciably degrading the SOI2, SOI4, SOI6, SOI8.

The ICS 402 may use optical signals to cancel the interference signals I1, I3, I5, I7. The ICS 402 may include an optical transmission module that may convert the interference signals I1, I3, I5, I7 and/or the SOI2, SOI4, SOI6, SOI8 from RF signals to optical signals. The optical transmission module may include a laser modulator for converting the RF signal to optical signals. The optical transmission module may invert the sample of the one or more of the interference signals I1, I3, I5, I7. The signals received from the transmit/receive unit 408 may each include an SOI2, SOI4, SOI6, SOI8 and one or more of the interference signals I1, I3, I5, I7. The inverted optical interference signals I1, I3, I5, I7 may be combined with the optical signals that include the SOI and one or more of the interference signals interference signal signals I1, I3, I5, I7. The inverted interference signals I1, I3, I5, I7 may cancel the interference from the signals having the SOI.

The interference from one or more of radios 414a, 414b, 414c, 414d may be cancelled using one or more optical paths. An optical path may include an instantaneous bandwidth of over 150 MHz. One or more of the interfering signals I1, I3, I5, I7 may be combined into a single optical interference signal for interference cancellation. The combined interfering signals may be used to cancel each interfering signal from the signals received at the transmit/receive unit 408. To further cancel one or more other interfering signals I1, I3, I5, I7, or one or more interfering signals I1, I3, I5, I7 received at another time period, additional multipath components may be implemented at the ICS 402. For example, a second and/or a third multipath component, as shown in FIG. 3 for example, may be implemented to perform additional interference cancellation.

The interference from one or more of radios 414a, 414b, 414c, 414d may be cancelled using a single optical path. The ICS 402 may determine a level of interference from the samples of multiple interference signals I1, I3, I5, I7. Multiple interference signals I1, I3, I5, I7 may be combined for cancellation. One or more of the signals received from the transmit/receive unit 408 that include the SOI2, SOI4, SOI6, and/or SOI8 may be combined. The combined interference signals I1, I3, I5, and/or I7 may be inverted and combined with the signals received from the transmit/receive unit 408. The signal that includes the multiple inverted interference signals I1, I3, I5, and/or I7 may cancel the interference of the signals received from the transmit/receive unit 408. Using the combined interference signal, the interference from multiple radios 414a, 414b, 414c, 414d may be negated with a single optical signal and/or a single optical path.

The signals received at the ICS 402 from the transmit/receive unit 408 may be received by the ICS 402 at a different time or frequency than the samples of the interfering signals I1, I3, I5, I7. For example, the signals received at the ICS 402 from the transmit/receive unit 408 may be received over the air and may be received later in time than the interfering signals I1, I3, I5, I7, which may be received via a wireline connection. Variable optical delays may be used in the ICS 402 to cause delays in received signals for interference cancellation. The delay may allow the interfering signals I1, I3, I5, I7 to align with the signals received from the transmit/receive unit 408 for cancellation. A length of optical cable in the ICS 402 may provide the sample of the interfering signals I1, I3, I5, I7 to a tapped delay line with a delay that is close to the antenna coupling delay. The length of the delay may be used to minimize dispersion for broadband cancellation and/or provide RF isolation. Variable optical attenuators may be used in the optical ICS 402 to achieve an RF power level for interference cancellation. The Laser Modulator 1 and 2 in FIG. 3 may provide the phase shift to allow the interfering signals I1, I3, I5, I7 to align with the signals received from the transmit/receive unit 408 for cancellation.

The ICS 402 may convert the optical signal to an RF signal and may send the signal to the RF filter 424. The RF filter 424 may be a tunable RF filter. The RF filter 424 may clean up the RF signals before they may be sent to and/or processed by any other module in the system. The clean up by the RF filter 424 may prevent generation of harmonics and/or intermods within the system. The RF filter 424 may separate the SOI2, SOI4, SOI6, and/or SOI8. The RF filter 424 may provide isolation between one or more of the radios 416a, 416b, 416c, 416d by separating the SOI2, SOI4, SOI6, and/or SOI8 according to the frequency of the corresponding radio 416a, 416b, 416c, 416d to which each SOI may be directed.

The RF filter 424 may send one or more of the signals SOI2, SOI4, SOI6, SOI8 to a signal processor 426. The signal processor 426 may be an RF and/or digital signal processor for processing RF and/or digital signals. The received SOI2, SOI4, SOI6, SOI8 may have some residual interference. The signal processor 426 may determine if the signal is clean enough for sending to the intended radio 416a, 416b, 416c, 416d. The signal processor 426 may determine cleanliness of the SOI2, SOI4, SOI6, and/or SOI8 based on the signal to noise ratio (SNR). The processor may determine whether the SNR for the SOI2, SOI4, SOI6, and/or SOI8 meets a threshold. The signal processor may be used to determine the SNR by measuring a peak to average power spectrum density ratio, which may be used for the interference cancellation level indication for example. The threshold may be a minimum level at which a user may understand the SOI2, SOI4, SOI6, and/or SOI8, such as a 10 dB threshold for example. If the peak to average power spectrum density ratio does not meet the threshold for a SNR, then the signal processor 426 may prevent the signal from being passed to the intended radio 416a, 416b, 416c, 416d and/or may send the signal to the ICS 402 for further interference cancellation. The signal processor may wait until the cancellation depth reaches a predetermined value to apply the signal to the input of the radio transceiver.

The signal processor 426 may include an RF correlator 428 that may be used to detect the SOI2, SOI4, SOI6, SOI8, based on a sample for example. The RF correlator 428 may determine whether the SNR between one or more of the SOI2, SOI4, SOI6, SOI8 and one or more interfering signals I1, I3, I5, I7 meets a threshold. If the SNR meets the threshold, then the signal may be passed to the intended radio 416a, 416b, 416c, 416d for reception. Any resultant interference signal may cause the RF correlator 428 to send an output at the signal processor, which may be used to control amplitude and/or phase of the weighting networks made up of variable optical attenuators and delay lines in the optical ICS. The SNR may be determined based on a received signal strength indication (RSSI) that may be measured by the RF correlator.

level for the SOI may be 20 W. Interferer 1 and Interferer 2 may be two of the interfering signals I1, I3, I5, I7. The SOI may be one of SOI2, SOI4, SOI6, SOI8. While two interfering signals are used in the example in Table 1, the example illustrated in Table 1 may be implemented using any number of interfering signals.

TABLE 1

| SIGNAL-TO-NOISE RATIO FOR SOI AND TWO INTERFERERS (Interferer 1 & Interferer 2) @ 300 MHz | | | | | | | | | |
|---|---|---|---|---|---|---|---|---|---|
| Interferer 1 Path Loss in dB 2.2 m away @ 300 MHz | Interferer 1 Tx Power in BW = 150 MHz in W - 29 dB Path Loss | Interferer 1 Tx Power in BW = 150 MHz in dBm - 29 dB Path Loss | Interferer 1 Tx Power in BW = 25 kHz in dBm - 29 dB Path Loss | Interferer 2 Path Loss in dB 50 m away @ 300 MHz | Interferer 3 Tx Power in BW = 150 MHz in W - 56 dB Path Loss | Interferer 2 Tx Power in BW = 150 MHz in dBm - 56 dB Path Loss | Interferer 3 Tx Power in BW = 25 kHz in dBm - 56 dB Path Loss | SOI2 Rx Power in BW = 25 kHz in W - 56 dB Path Loss | SOI2 Rx Power in BW = 25 kHz in dBm - 56 dB Path Loss |
| 29 | 0.13 | 21.00 | -16.78 | 56.00 | 0.00025 | -6.02 | -43.80 | 0.00005 | -13.01 |
| Interferer 1 and 2 BW in kHz | | | SOI2 BW in kHz | | SOI2 to Interferer 1 SNR in dB | | SOI2 to Interferer 3 SNR in dB | | |
| 150000 | | | 25 | | 3.77 | | 30.79 | | |

The RSSI value may indicate that the measured signal may be sent to the ICS 402 for additional interference cancellation and/or that the ICS 402 may be tuned to improve interference cancellation. If the received RSSI value of the received signal is above the threshold, the signal processor 426 may determine that the signal includes interference. The RF correlator 428 may measure the amount by which the received signal exceeds the threshold and may use this amount to tune the ICS 402 to more accurately cancel the interference from the received signals.

If an SOI2, SOI4, SOI6, SOI8 is too low, an RF correlator 428 may be used to raise the SOI2, SOI4, SOI6, SOI8. For example, the SOI2, SOI4, SOI6, SOI8 may be raised to at least the threshold level. The signal processor 426 may prevent the signal from being passed to the intended radio 416*a*, 416*b*, 416*c*, 416*d* until the SNR may be improved (e.g., through further interference cancellation and/or increasing the SOI) such that it reaches the threshold.

The filtered signal may be returned to the ICS 402 one or more times for additional signal cancellation to filter out residual interference. The signal may be processed by the ICS 402 a predetermined number of times or until the SNR reaches a threshold. The signal processor 426 may send the filtered signal back to the ICS 402 if the SNR does not reach the threshold. The signal processor 426 may send a received signal strength indication (RSSI) to the control unit 412. The RF correlator may measure an amount of power of the received signal at the signal processor 426 and may send the RSSI to the control unit 412. The control unit 412 may determine whether to continue to filter the signal based on the total power of the signal. If the total power of the signal is above a threshold, such as a power threshold at which data may be received, the signal may include additional interference. The control unit 412 may instruct the signal processor to send the filtered signal to the ICS 402 for further processing.

Table 1, illustrated below, comprises an example of the SNR for multiple interfering signals and an SOI. In Table 1, Interferer 1 and Interferer 2 are used as example interfering signals, but one or more interfering signals may be used. The power level of Interferer 1 may be equal to the power level of Interferer 2. The power level of Interferer 1 and Interferer 2 for the example shown in Table 1 may be 100 W. The power As shown in Table 1, the SNR for the SOI and Interferer 1 may be below a threshold and the SNR for the SOI and Interferer 2 may be above a threshold. The threshold may be 10 dB, which may be a minimum level at which a user may understand the SOI. The SNR for the SOI and Interferer 1 may be 3.77 dB. The SNR for the SOI and Interferer 2 may be 30.8 dB. The higher SNR for the SOI and Interferer 2 may be because the transmit power of Interferer 2 may be spread over a larger bandwidth (e.g., 150 MHz) compared to the bandwidth of the radio receiver (e.g., 25 kHz). The transmit power of Interferer 1 may be transmitted over the same bandwidth as Interferer 2 (e.g., 150 MHz), but the power level of Interferer 1 (e.g., 21 dBm) may be higher than that of Interferer 2 (e.g., -6.02 dBm). With the difference in power, the lower SNR for the SOI and Interferer 1 may not meet the predetermined threshold.

As illustrated by the example shown in Table 1, cancellation of a portion of the interfering signals may be enough to satisfy the predetermined threshold. For example, since the SNR for the SOI and Interferer 2 may be higher than the predetermined threshold, the interfering signal from Interferer 2 may not be cancelled by the optical ICS 402. As the SNR for the SOI and Interferer 1 may be lower than the predetermined threshold, the interfering signal from Interferer 1 may be cancelled by the optical ICS 402. The same determination may be made (e.g., at the optical ICS 402) for any number of interfering signals. The SNR may be determined for each interfering signal independently or in combination with other interfering signals.

Figure 5:
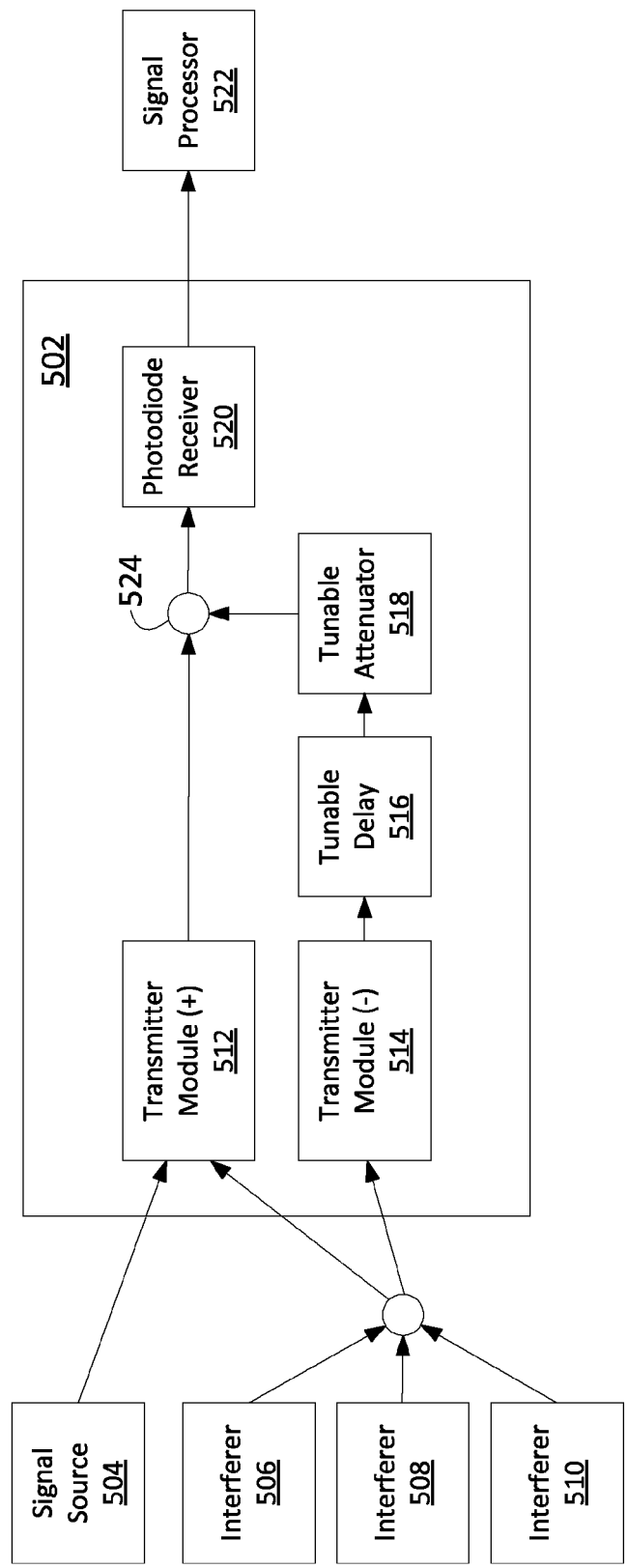
FIG. 5 is a diagram that depicts another example of an ICS for cancelling interference from multiple interferers.

FIG. 5 is a diagram that depicts an example architecture for an optical ICS 502 for one or more of interferers 506, 508, 510. An optical cancellation path shown in ICS 502 may be used for one or more of the signals received from the interferers 506, 508, 510. The interferers 506, 508, 510 may transmit within a 150 MHz bandwidth. The optical ICS 502 may include an ICS transmitter module (+) 512 configured to receive an SOI from the signal source 504 and interference signals from one or more of the interferers 506, 508, 510. A sample of the RF signals from one or more of the interferers 506, 508, 510 may be received at the transmitter module (-) 514. Once the ICS 502 receives the RF signals it may convert them to optical for cancellation of the interference. The transmitter module (-) 514 may change the interfering signals 180 degrees to cancel out the one or more of the interfering signals received at the transmitter module (+) 512.

A tunable delay 516 may be implemented to adjust the timing of signals received at the ICS 502 for interference cancellation. The tunable delay 516 may delay one or more interfering signals received at the transmitter module (−) 514 so that they may be aligned in time with one or more signals received at the transmitter module (+) 512. The signals received at the transmitter module (+) 512, which may be received over the air, may have a larger delay between transmission and receipt than the interfering signals received at the transmitter module (−) 514, which may be wired transmission that may be coupled directly to the ICS 502. The tunable delay 516 may be used to balance out the distance between the two paths.

A tunable attenuator 518 may be implemented to adjust the signal strength of one or more interfering signals for interference cancellation. The tunable attenuator 518 may know signal strength at which one or more interfering signals may be received at the transmitter module (+) 512. The tunable attenuator 518 may change the level of the interfering signals received at the transmitter module (−) 514 so that the signal strength is the same, or similar, to the signal strength of the interference received at the transmitter module (+) 512.

While the ICS 502 may be depicted with a single optical cancellation path, one or more optical cancellation paths may be implemented in the optical ICS 502. Each optical cancellation path may include an optical transmitter module (−), a tunable delay, and/or a tunable attenuator. The number of optical cancellation paths may depend on the environment in which the optical ICS 502 is implemented. For example, in an environment with buildings or other objects that may cause signal delay, multiple optical paths may be used to capture delayed signals. The optical ICS 502 may include an optical cancellation path per interfering signal or group of interfering signals. The optical ICS 502 may implement each optical cancellation path based on a time period in which one or more interfering signals may be received. For example, the interfering signals from interferer 506 and interferer 508 may be received within a same time period and may be grouped together for processing via one optical cancellation path, while the interfering signal from the interferer 510 may be received later in time and may be processed via another optical cancellation path. If the RSSI value of one or more signals meets a threshold, multiple paths may be used.

After the interfering signals are processed by the tunable delay 516 and/or tunable attenuator 518, the interfering signal may be cancelled at 524. The inverted interference signals may be combined with the signals from the transmitter module (+) 512 to cancel the interference. A tapped delay line/weighting network summed output may be combined with a receiver antenna input through a laser modulator (−) for coherent cancellation of the interference signal. The SOI may be output to the photodiode receiver after cancellation has been performed. The photodiode receiver 524 may transfer the SOI from optical to RF for being sent as output to a signal processor 522.

A tunable delay 516 and/or the tunable attenuator 518 may be adjusted to improve the timing and/or signal strength of received signals. The signal processor 522 may perform measurements on the RSSI and the tunable delay 516 and/or the tunable attenuator 518 may be adjusted based on the RSSI. The signal processor 522 may measure the residual signal strength over which the RSSI value exceeds a threshold and may change the delay to meet the threshold value.

The control loop may vary both gain and phase shift for power meter output, which may indicate an effectively cancelled interference signal. DC offset in the control group may not reduce the cancellation efficiency because, if present, it may be added to the power meter output value and may not affect the difference used for the control group operation. These DC offsets may be due to electronic component DC offsets and/or background noise presence in the RF signal at the input of the power meter. The interference cancellation attenuation may be a function of the power meter dynamic range and/or SOI bandwidth.

Figure 6:
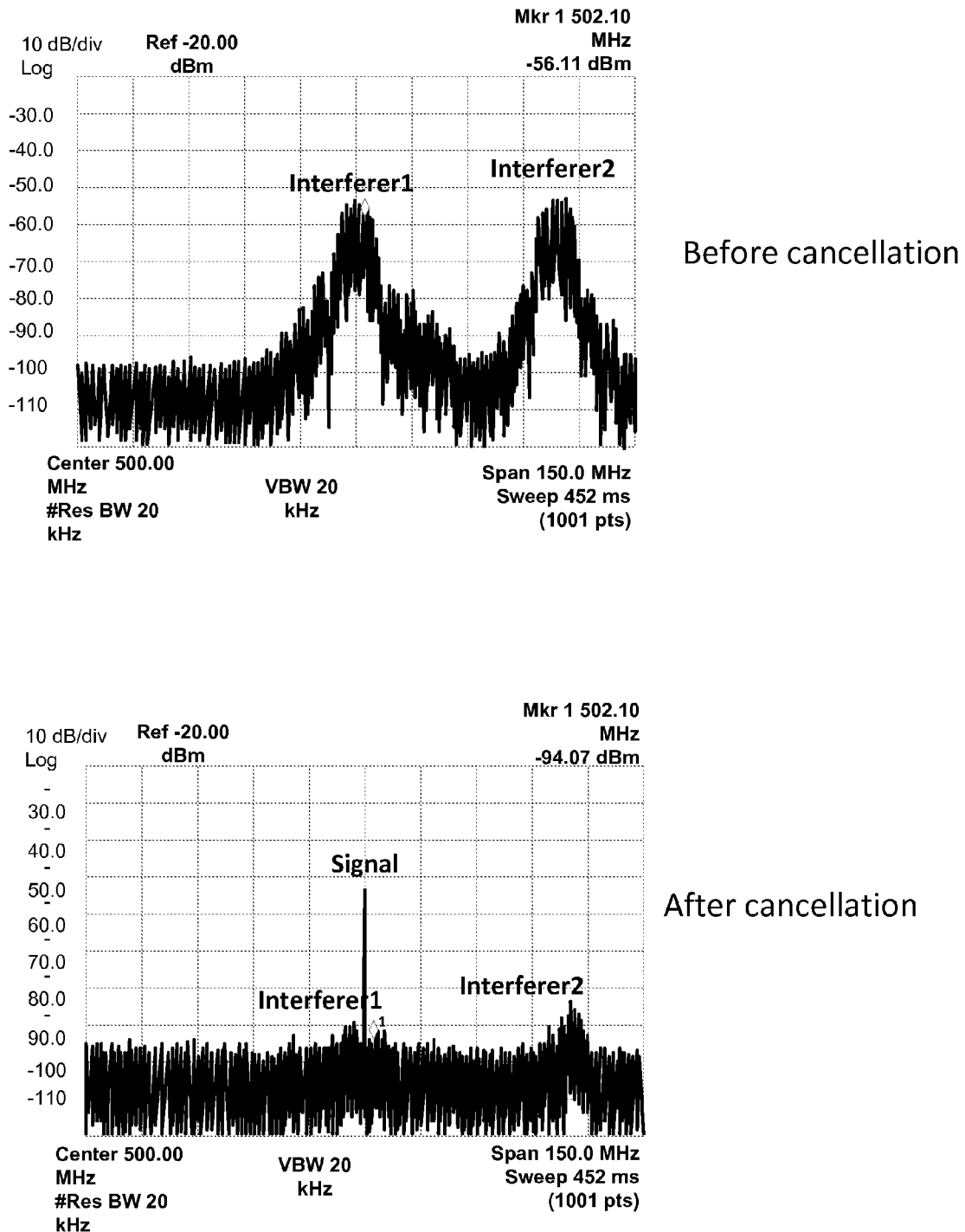
FIG. 6 is a graph that depicts an example signal before and after cancellation of interference from multiple interferers.
Figure 7:
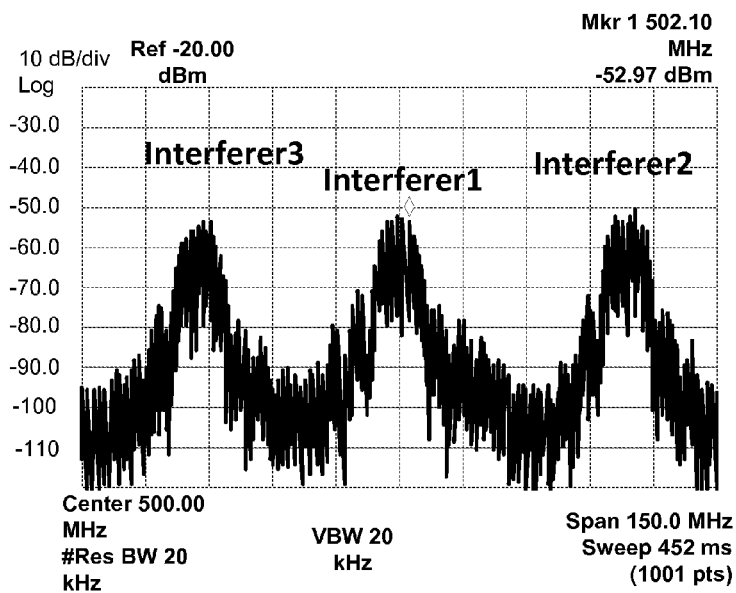
FIG. 7 is a graph that depicts another example signal before and after cancellation of interference from multiple interferers.
Figure 7:
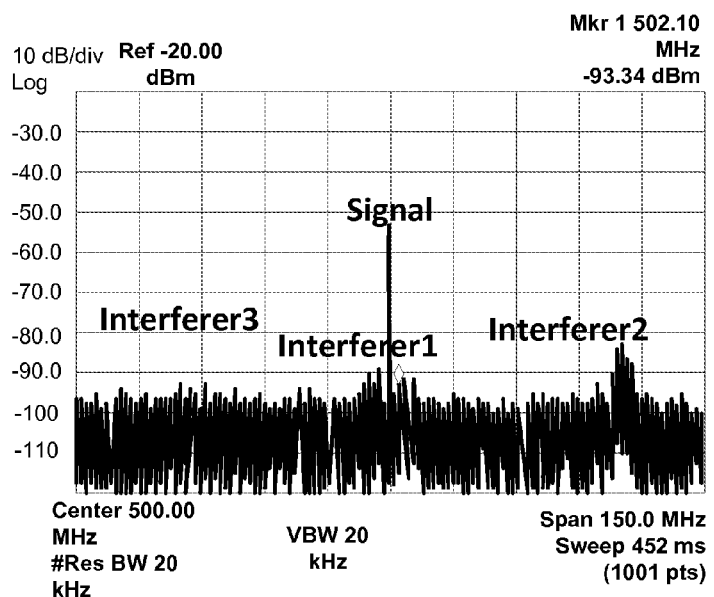

FIGS. 6 and 7 are graphs that illustrate the performance of the optical ICS for two interferers, Interferer 1 and Interferer 2, and three interferers, Interferer 1, Interferer 2, and Interferer 3, respectively. The spectral bandwidth of the signals in FIGS. 6 and 7 may be 150 MHz. The SNR is illustrated in as the difference between the SOI and the interference signals shown in FIGS. 6 and 7.

FIG. 6 is a graph that illustrates the performance of the optical ICS for two interferers, Interferer 1 and Interferer 2. As shown in FIG. 6, Interferer 1 and Interferer 2 may be received at about −56 dBm before cancellation, which may be about the strength at which the SOI may be received. After cancellation, Interferer 1 and Interferer 2 may have a signal strength of about −94 dBm. This interference cancellation may allow a user to properly receive the SOI. The cancellation attenuation may be about 38 dB.

FIG. 7 is a graph that illustrates the performance of the optical ICS for three interferers, Interferer 1, Interferer 2, and Interferer 3. As shown in FIG. 7, Interferer 1, Interferer 2, and Interferer 3 may be received at about −53 dBm before cancellation, which may be about the strength at which the SOI may be received. After cancellation, Interferer 1, Interferer 2, and Interferer 3 may have a signal strength of about −93 dBm. The SNR after cancellation may be about 40 dB. While cancellation attenuation in FIGS. 6 and 7 may be between about 38 dB and 40 dB, cancellation attenuation may be in excess of 45 dB in 150 MHz bandwidth.

Although features and elements are described above in particular combinations, each feature or element can be used alone or in any combination with the other features and elements. Though the features and elements may be implemented for handling co-site, narrowband, and/or wideband interference, they may be implemented on other programs. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, terminal, base station, RNC, or any host computer.

What is claimed:
1. An interference cancellation system (ICS) comprising:
   radio frequency (RF) circuitry configured to receive a plurality of RF interference signals and a combined signal, the plurality of RF interference signals comprising a first RF interference signal and a second RF interference signal, and the combined signal comprising a combination of a signal of interest (SOI) and at least the plurality of RF interference signals;

optical circuitry configured to:
    convert the first RF interference signal to a first optical interference signal and apply a 180 phase shift to the first optical interference signal,
    convert the second RF interference signal to a second optical interference signal and apply a 180 phase shift to the second optical interference signal,
    convert the combined signal to an optical combined signal, wherein the optical circuitry comprises a first optical cancellation path and a second optical cancellation path, each of the first and second optical cancellation paths comprise an optical attenuator and an optical time delay, the first optical cancellation path is configured to attenuate and apply a time delay the first optical interference signal, and the second optical cancellation path is configured to attenuate and apply time delay the second optical interference signal, and
    combine the first optical interference signal after processing by the first optical cancellation path and the second optical interference signal after processing by the second optical cancellation path with the optical combined signal to generate an optical output signal, and
    convert the optical output signal to an RF output signal, the RF output signal comprising the SOI with the first and second RF interference signals substantially removed; and
a processor configured to control the attenuation and time delays applied via the first and second optical cancellation paths of the optical circuitry.

2. The ICS as in claim 1, wherein the plurality of RF interference signals further comprise a third RF interference signal, and the optical circuitry comprises a third optical cancellation path for processing the third RF interference signal after the third RF interference signal is converted to a third optical interference signal.

3. The ICS as in claim 2, wherein the plurality of RF interference signals further comprise a fourth RF interference signal, and the optical circuitry is configured to jointly process the third and fourth RF interference signals using the third optical cancellation path after the third and fourth RF interference signals are converted to a third and fourth optical interference signals.

4. The ICS as in claim 1, wherein the optical circuitry comprises at least one laser modulator that is configured to convert the first RF interference signal to the first optical interference signal, convert the second RF interference signal to the second optical interference signal, and convert the combined signal to the optical combined signal.

5. The ICS as in claim 4, wherein the processor is configured to control the optical circuitry based at least on part a received signal strength indication (RSSI) associated with the RF output signal.

6. The ICS as in claim 1, wherein the processor is configured to determine when a signal strength of the first RF interference signal exceeds a threshold, and control the optical circuitry to process the first interference signal using the first optical cancellation path based on the signal strength of the first interference signal exceeding the threshold.

7. The ICS as in claim 6, wherein the processor is configured to determine when a signal strength of the second RF interference signal exceeds a second threshold, and control the optical circuitry to process the second optical interference signal using the second optical cancellation path based on the signal strength of the second RF interference signal exceeding the threshold.

8. The ICS as in claim 7, wherein the processor is configured to deactivate the second optical cancellation path during time periods when the signal strength of the second interference signal is below the second threshold.

9. The ICS as in claim 1, wherein at least one of the first interference signal or the second interference signal is a remote signal estimated at the ICS.

10. The ICS as in claim 1, wherein the processor is configured to activate and deactivate each of the first and second optical cancellation paths based on the presence or absence of the first or second interference signals.

11. An interference cancellation system (ICS) comprising a processor configured to:
    control radio frequency (RF) circuitry, wherein the RF circuitry is configured to process a plurality of RF interference signals and a combined signal, the plurality of RF interference signals comprising a first RF interference signal and a second RF interference signal, and the combined signal comprising a combination of a signal of interest (SOI) and at least the plurality of RF interference signals; and
    control optical circuitry that is configured to:
        convert the first RF interference signal to a first optical interference signal and apply a 180 phase shift to the first optical interference signal,
        convert the second RF interference signal to a second optical interference signal and apply a 180 phase shift to the second optical interference signal,
        convert the combined signal to an optical combined signal, wherein the optical circuitry comprises a first optical cancellation path and a second optical cancellation path, each of the first and second optical cancellation paths comprise an optical attenuator and an optical time delay, the first optical cancellation path is configured to attenuate and apply a time delay the first optical interference signal, and the second optical cancellation path is configured to attenuate and apply time delay the second optical interference signal,
        combine the first optical interference signal after processing by the first optical cancellation path and the second optical interference signal after processing by the second optical cancellation path with the optical combined signal to generate an optical output signal, and
        convert the optical output signal to an RF output signal, the RF output signal comprising the SOI with the first and second RF interference signals substantially removed.

12. The ICS as in claim 11, wherein the plurality of RF interference signals further comprise a third RF interference signal, and the optical circuitry comprises a third optical cancellation path for processing the third RF interference signal after the third RF interference signal is converted to a third optical interference signal.

13. The ICS as in claim 12, wherein the plurality of RF interference signals further comprise a fourth RF interference signal, and the optical circuitry is configured to jointly process the third and fourth RF interference signals using the third optical cancellation path after the third and fourth RF interference signals are converted to a third and fourth optical interference signal.

14. The ICS as in claim 11, wherein the optical circuitry comprises at least one photodiode that is configured to convert the optical output signal to the RF output signal.

15. The ICS as in claim 4, wherein the processor is configured to control the optical circuitry based at least on part a received signal strength indication (RSSI) associated with the RF output signal.

16. The ICS as in claim 11, wherein the RF interference signals being substantially removed corresponds to a cancellation attenuation of each of the RF interference signals of approximately 40 dB or greater.

17. The ICS as in claim 6, wherein the RF interference signals being substantially removed corresponds to a cancellation attenuation of each of the RF interference signals to a level associated approximately at background noise.

18. The ICS as in claim 1, wherein at least one of the first interference signal or the second interference signal is a remote signal estimated at the ICS.

19. The ICS as in claim 1, wherein the processor is configured to activate and deactivate at least one of the first and second optical cancellation paths based on the presence or absence of the first or second interference signals.

20. An interference cancellation method comprising:
radio frequency (RF) receiving a plurality of RF interference signals and a combined signal, the plurality of RF interference signals comprising a first RF interference signal and a second RF interference signal, and the combined signal comprising a combination of a signal of interest (SOI) and at least the plurality of RF interference signals;
optical circuitry converting the first RF interference signal to a first optical interference signal and applying a 180 phase shift to the first optical interference signal;
the optical circuitry converting the second RF interference signal to a second optical interference signal and applying a 180 phase shift to the second optical interference signal;
the optical circuitry converting the combined signal to an optical combined signal, wherein the optical circuitry comprises a first optical cancellation path and a second optical cancellation path, each of the first and second optical cancellation paths comprise an optical attenuator and an optical time delay, the first optical cancellation path is used to attenuate and apply a time delay the first optical interference signal, and the second optical cancellation path is used to attenuate and apply time delay the second optical interference signal;
the optical circuitry combining the first optical interference signal after processing by the first optical cancellation path and the second optical interference signal after processing by the second optical cancellation path with the optical combined signal to generate an optical output signal; and
the optical circuitry converting the optical output signal to an RF output signal, the RF output signal comprising the SOI with the first and second RF interference signals substantially removed.

* * * * *